United States Patent
Kwon et al.

(10) Patent No.: US 11,796,406 B2
(45) Date of Patent: Oct. 24, 2023

(54) APPARATUS AND METHOD FOR DETECTING COMPOSITE MATERIAL DAMAGE DUE TO IMPACT BY USING DISTRIBUTED OPTICAL FIBERS

(71) Applicant: KOREA RESEARCH INSTITUTE OF STANDARDS AND SCIENCE, Daejeon (KR)

(72) Inventors: Il-Bum Kwon, Yuseong-Gu (KR); Dae-Cheol Seo, Daejeon (KR); Chi Yup Kim, Yongin-si (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 256 days.

(21) Appl. No.: 16/961,160

(22) PCT Filed: Jan. 10, 2019

(86) PCT No.: PCT/KR2019/000417
§ 371 (c)(1),
(2) Date: Jul. 9, 2020

(87) PCT Pub. No.: WO2019/139387
PCT Pub. Date: Jul. 18, 2019

(65) Prior Publication Data
US 2020/0340871 A1    Oct. 29, 2020

(30) Foreign Application Priority Data
Jan. 10, 2018   (KR) .................. 10-2018-0003540

(51) Int. Cl.
*G01L 1/24* (2006.01)
*G01D 5/353* (2006.01)
*G01M 5/00* (2006.01)

(52) U.S. Cl.
CPC .......... *G01L 1/242* (2013.01); *G01D 5/35351* (2013.01); *G01M 5/0033* (2013.01)

(58) Field of Classification Search
CPC ......... G01L 1/242; G01L 1/247; G01D 5/353; G01D 5/35351; G01D 5/35364; G01M 11/083; G01M 11/085; G01M 11/086
See application file for complete search history.

(56) References Cited

U.S. PATENT DOCUMENTS 5,245,180 A * 9/1993 Sirkis .................. G08B 13/126
                                                  250/227.16

FOREIGN PATENT DOCUMENTS

| JP | 2002062118 A | * | 2/2002 |
| JP | 2002-107122 A | | 4/2002 |

(Continued)

OTHER PUBLICATIONS

International Search Report of corresponding PCT Application No. PCT/KR2019/000417—4 Pages (dated Apr. 3, 2019).

*Primary Examiner* — Herbert K Roberts
(74) *Attorney, Agent, or Firm* — Knobbe, Martens, Olson & Bear, LLP

(57) ABSTRACT

An apparatus and method for detecting composite material damage due to impact by using distributed optical fiber are disclosed. In the apparatus and method for detecting composite material damage due to impact by using distributed optical fiber, the position and level of damage occurring in a composite material due to low-velocity impact can be effectively and economically detected by measuring the residual strain of optical fiber distributed on the surface of the composite material or inside the composite material. In the apparatus and method for detecting composite material damage due to impact by using distributed optical fiber, there is no need to always operate a sensor in real time, so that detection errors due to temporary failures, malfunctions, (Continued)

etc. of the sensor, as well as a problem of constantly supplying power to the sensor, can be essentially removed.

4 Claims, 21 Drawing Sheets

(56) References Cited

FOREIGN PATENT DOCUMENTS

| | | | |
|---|---|---|---|
| JP | 2003-065942 A | | 3/2003 |
| JP | 3492943 B2 | * | 2/2004 |
| JP | 3492943 B2 | | 2/2004 |
| JP | 2006-208264 A | | 8/2006 |
| KR | 10-2009-0069069 A | | 6/2009 |
| KR | 100945290 B1 | * | 3/2010 |
| KR | 10-1168399 B1 | | 7/2012 |

* cited by examiner

[FIG. 1]
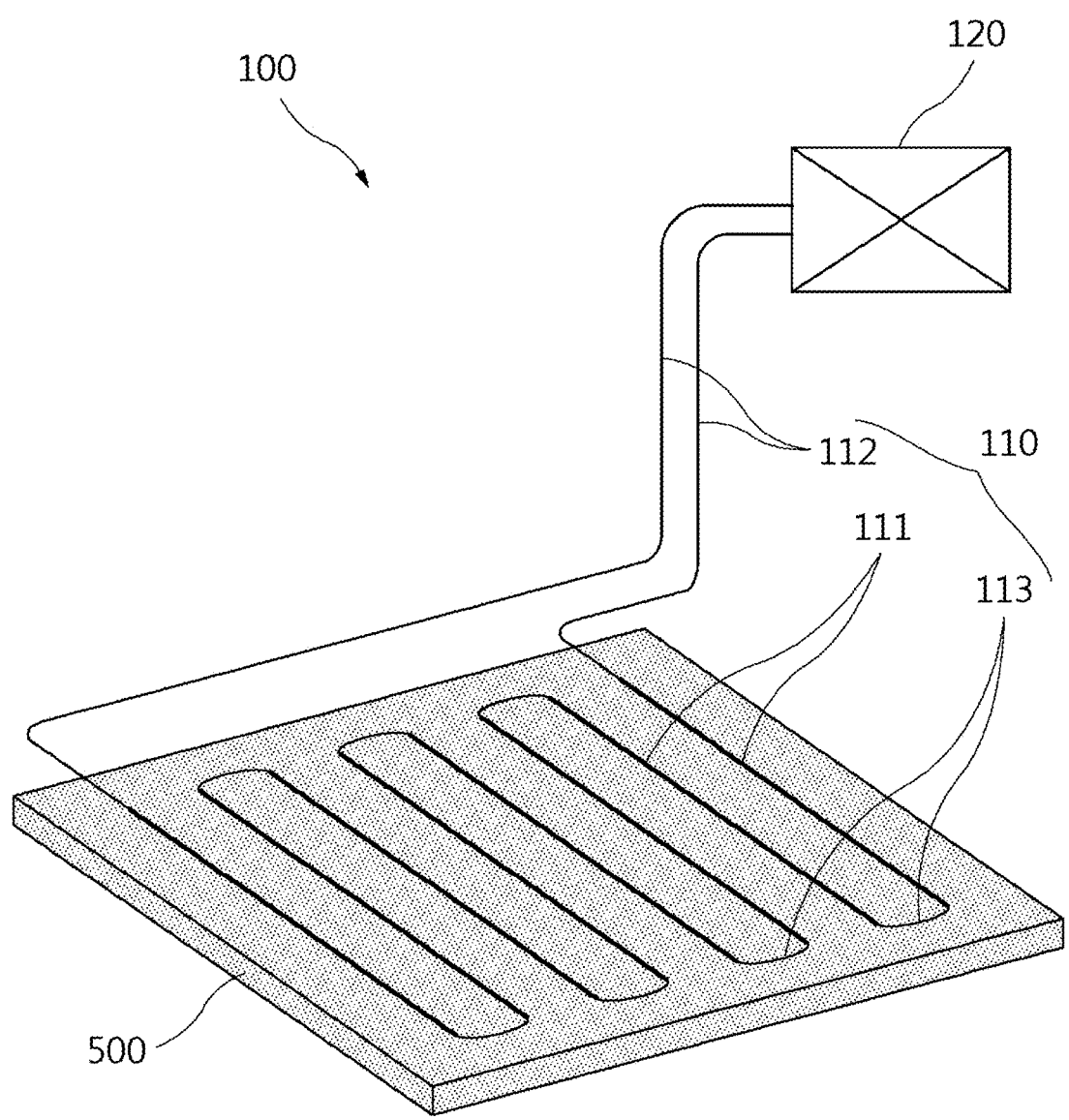

[FIG. 2]
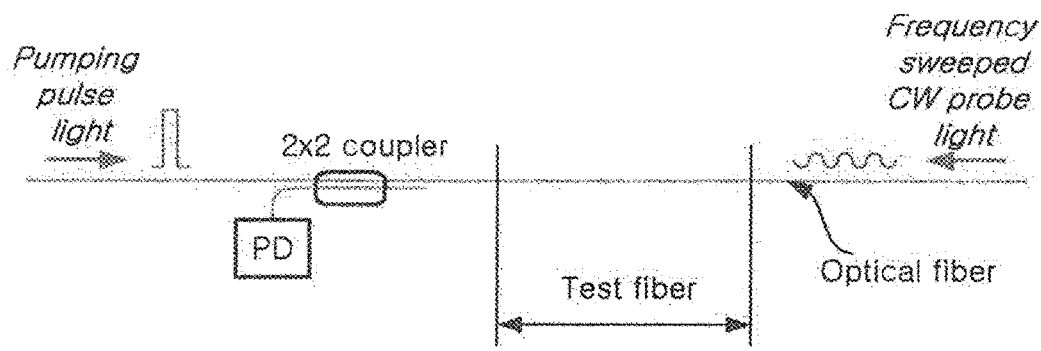
(A)
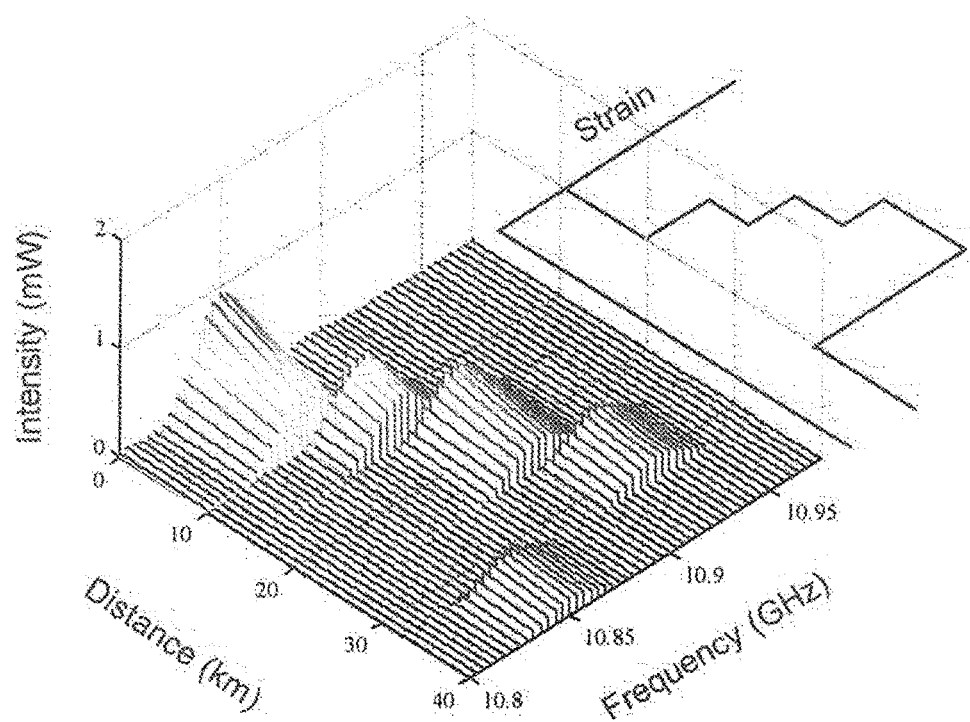
(B)

[FIG. 3]
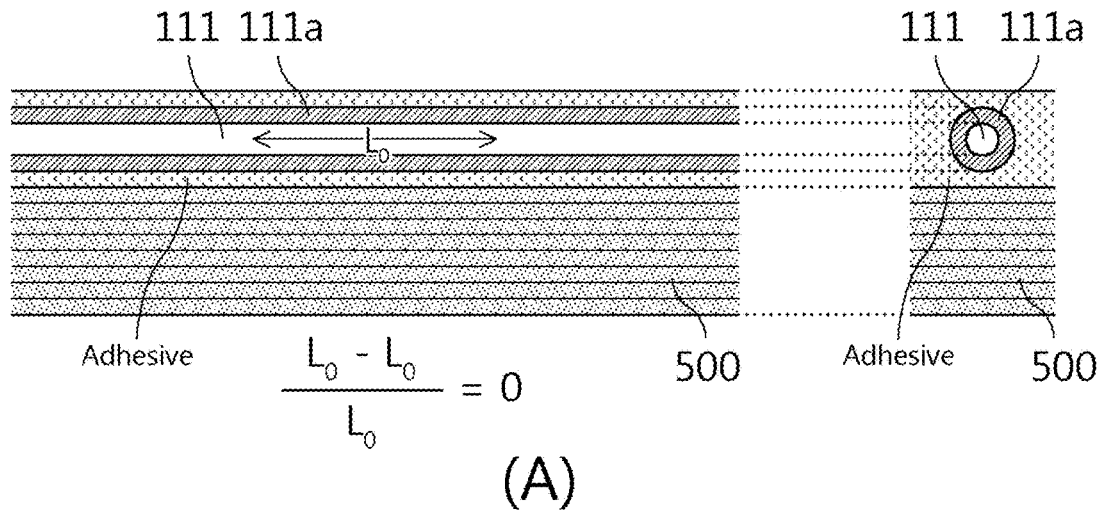
(A)
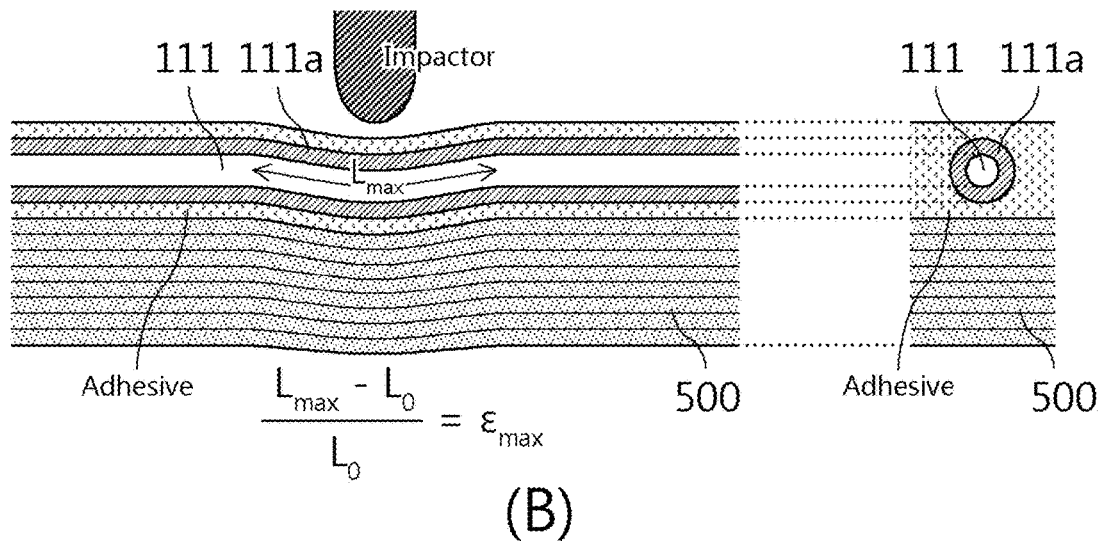
(B)
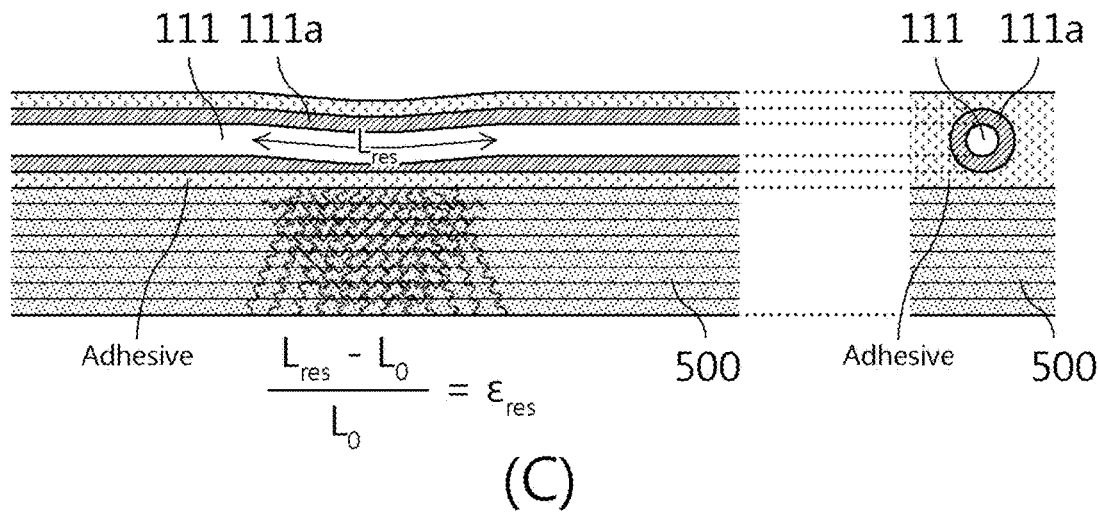
(C)

[FIG. 4]
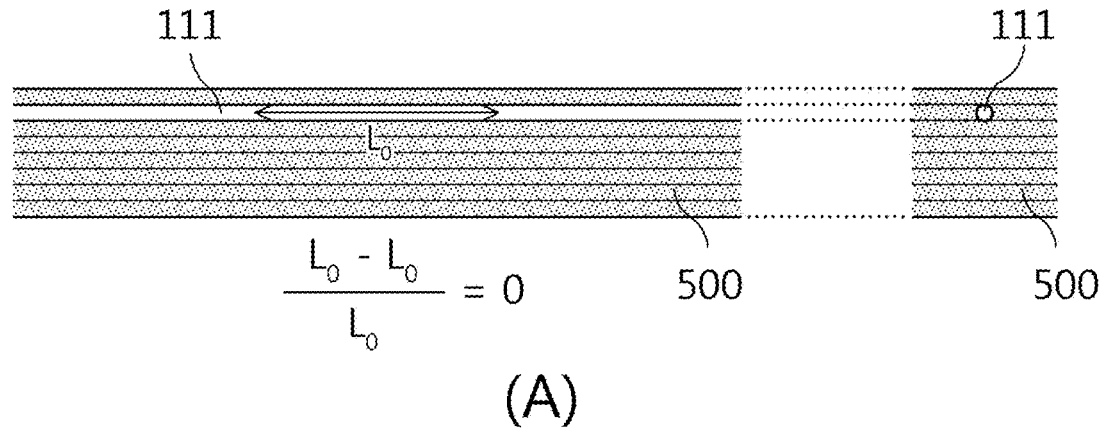
(A)
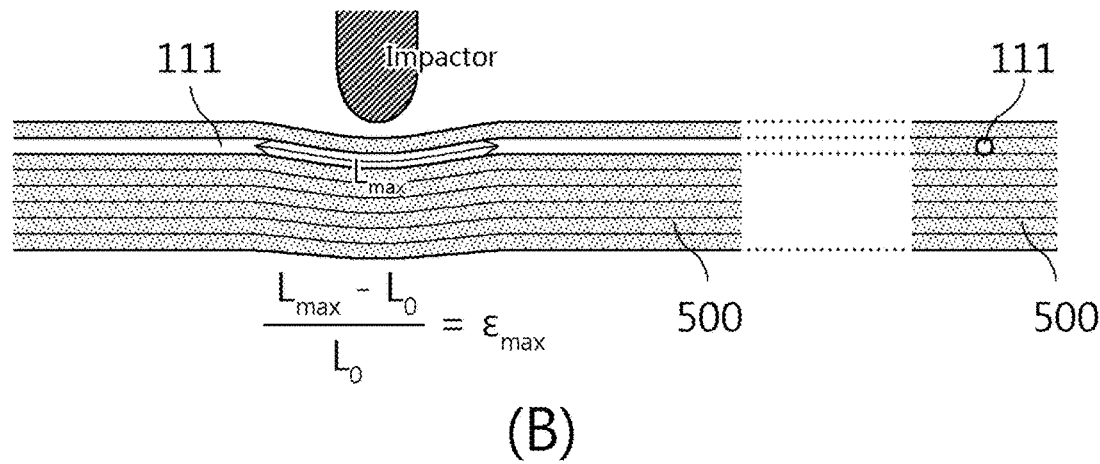
(B)
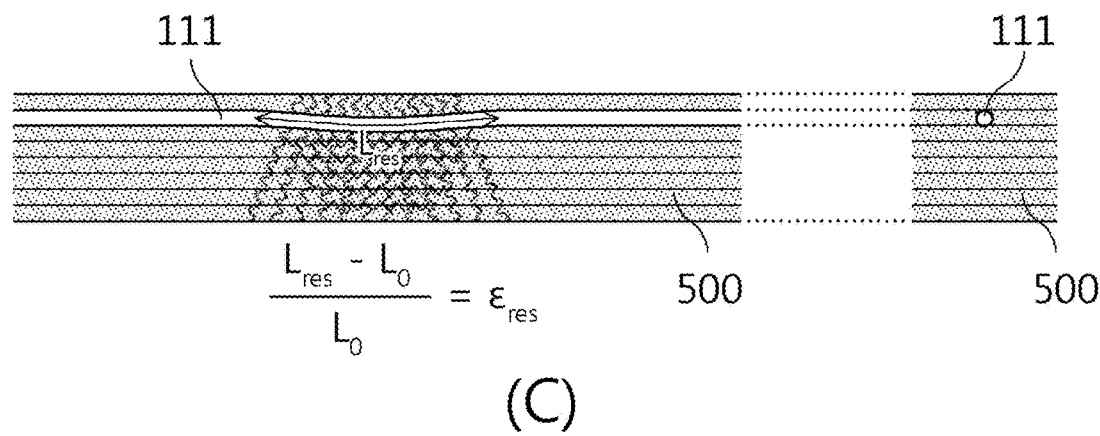
(C)

[FIG. 5]
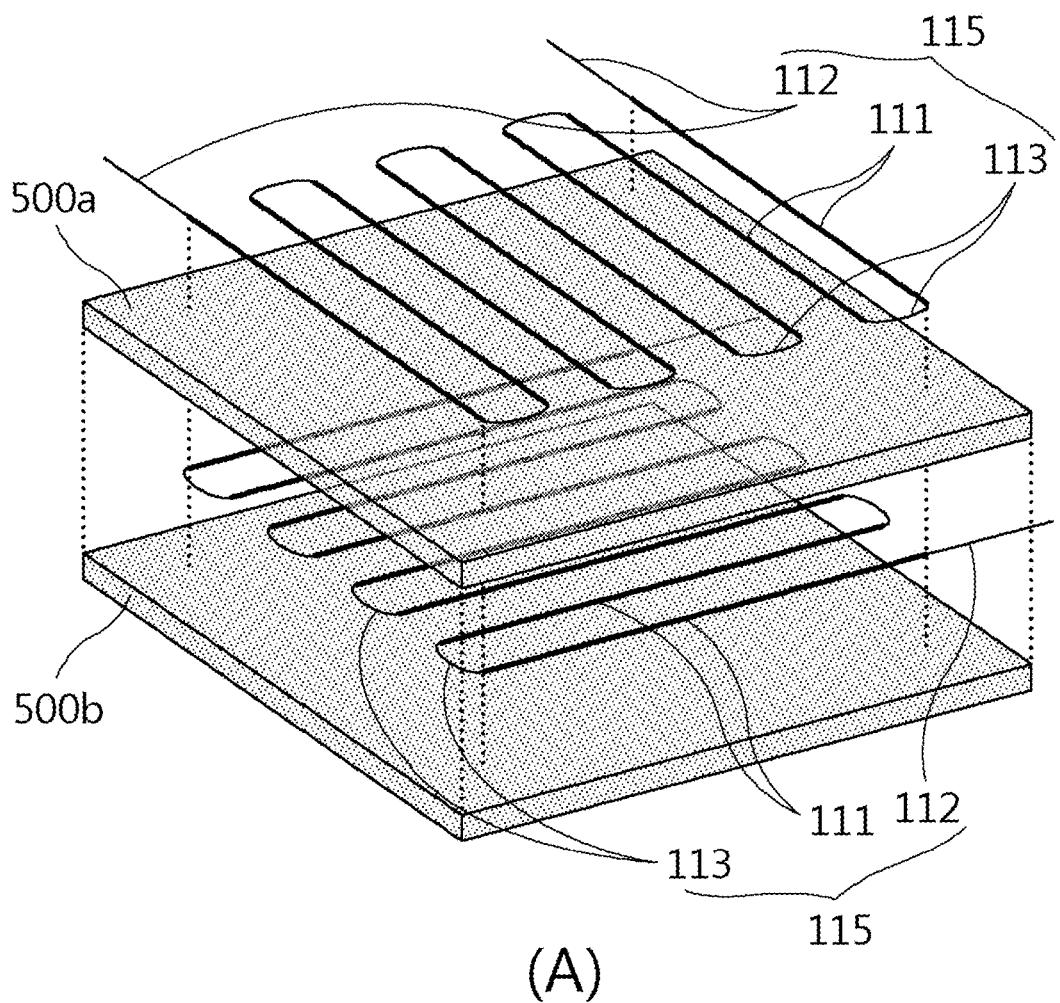
(A)
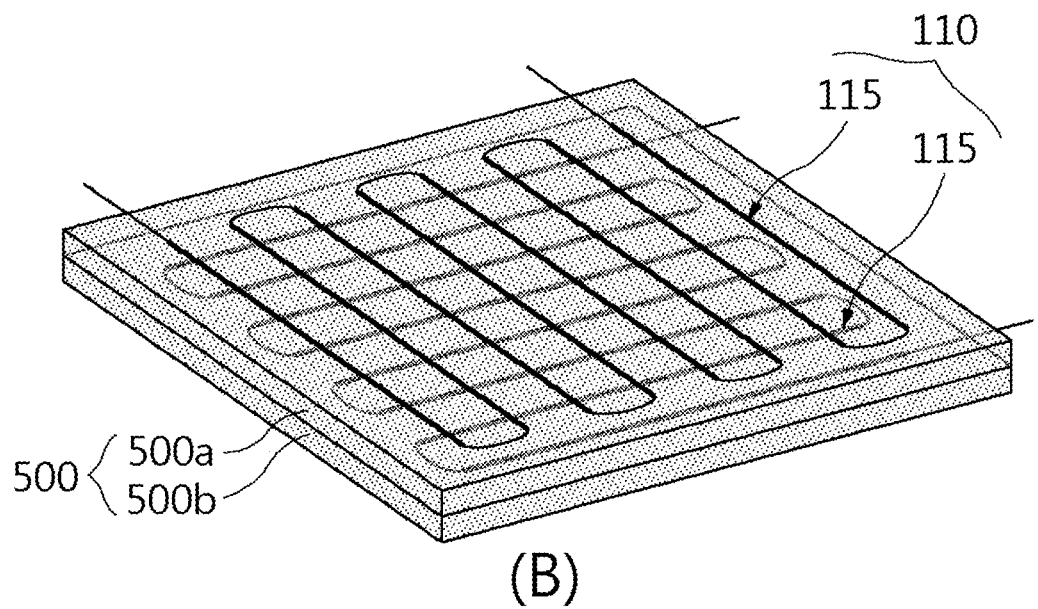
(B)

[FIG. 6]
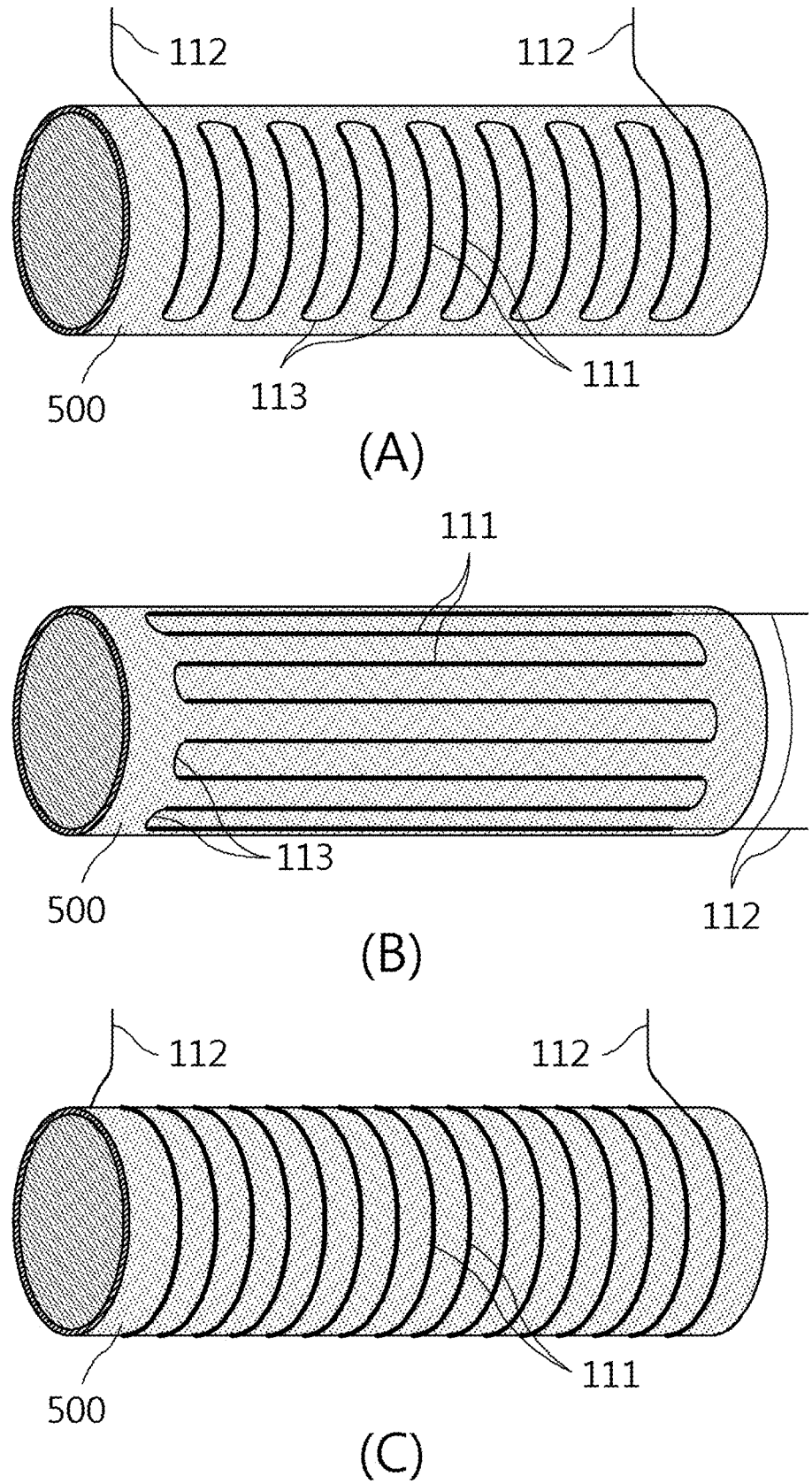

[FIG. 7]
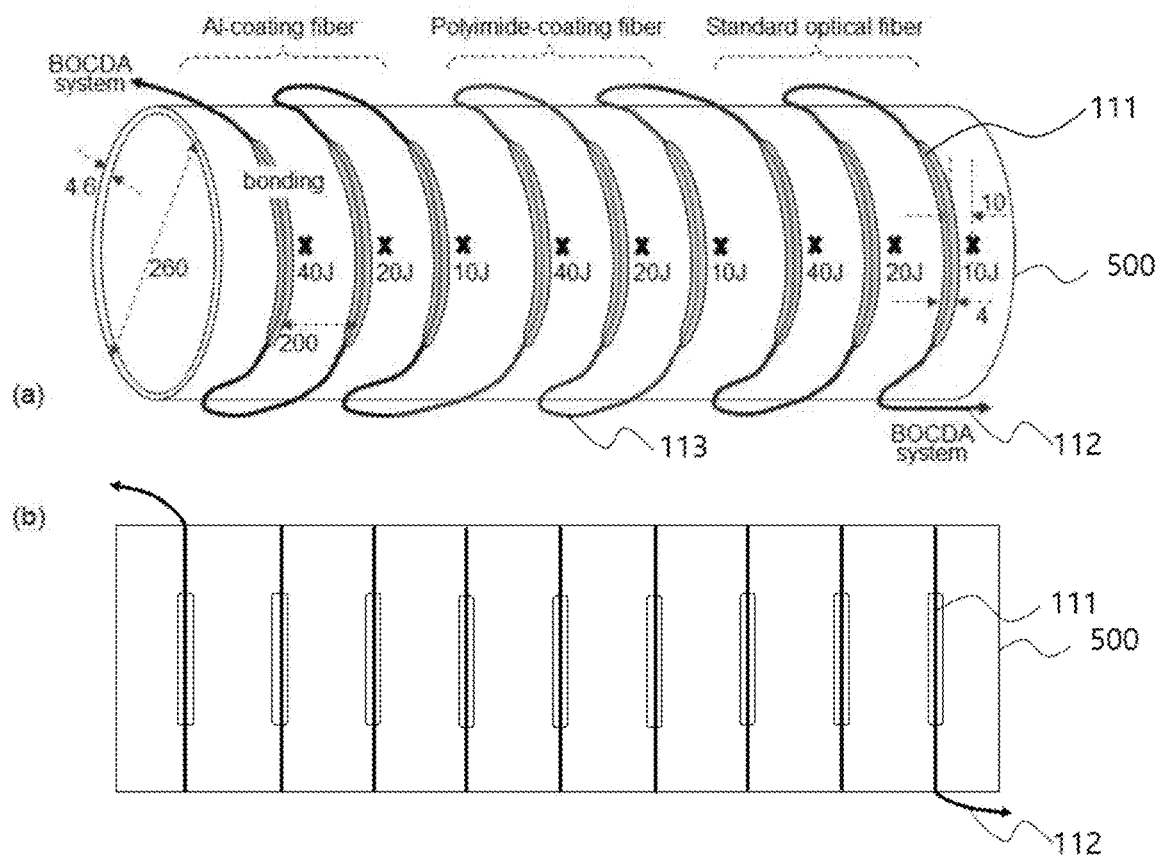
[FIG. 8]
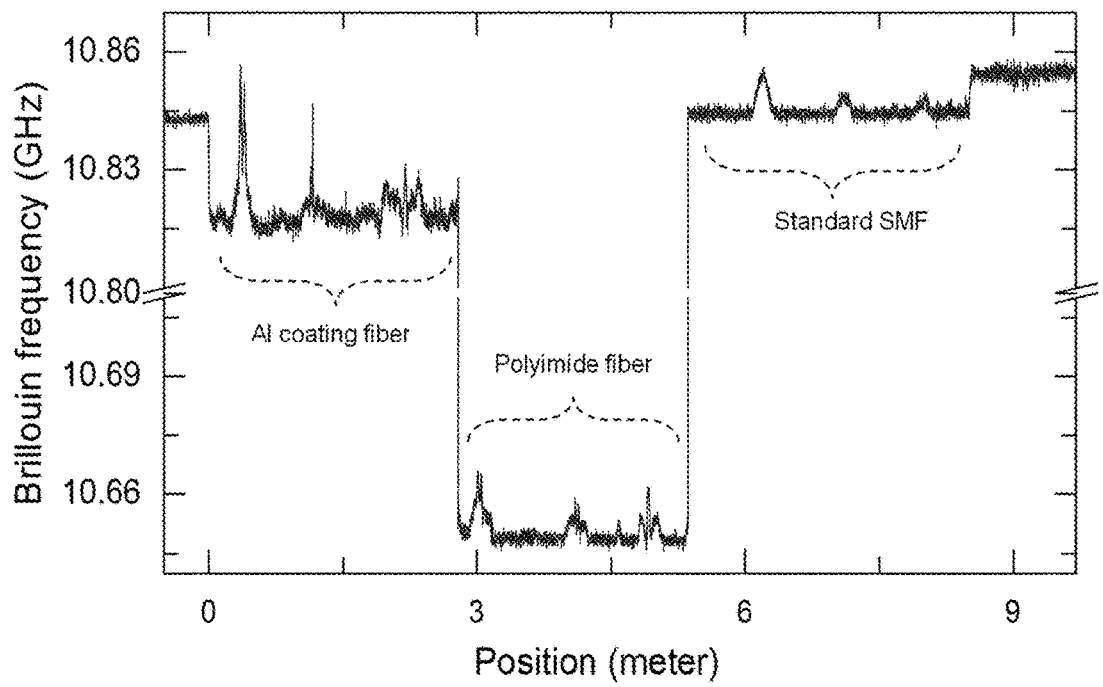

[FIG. 9]
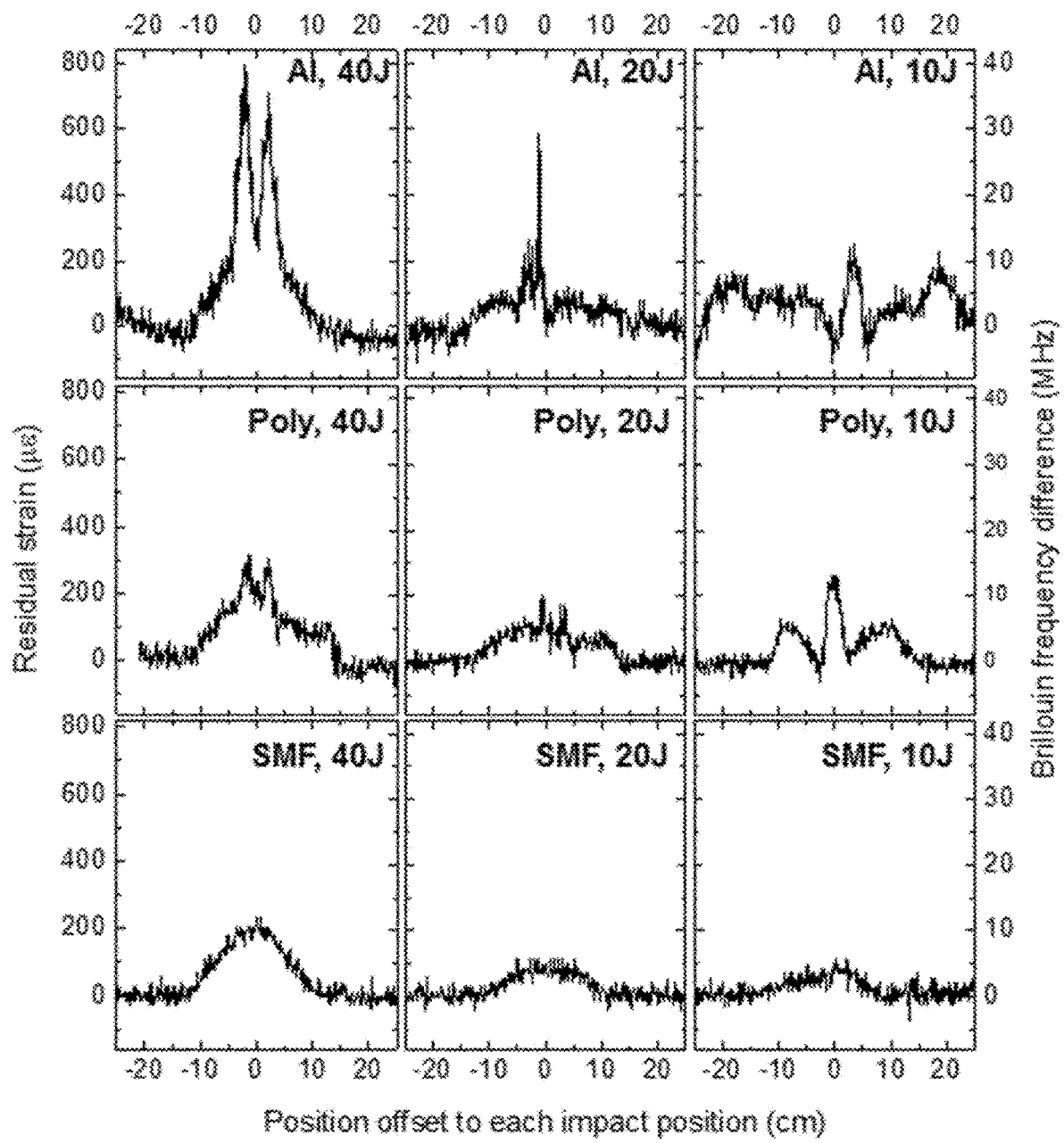

[FIG. 10]
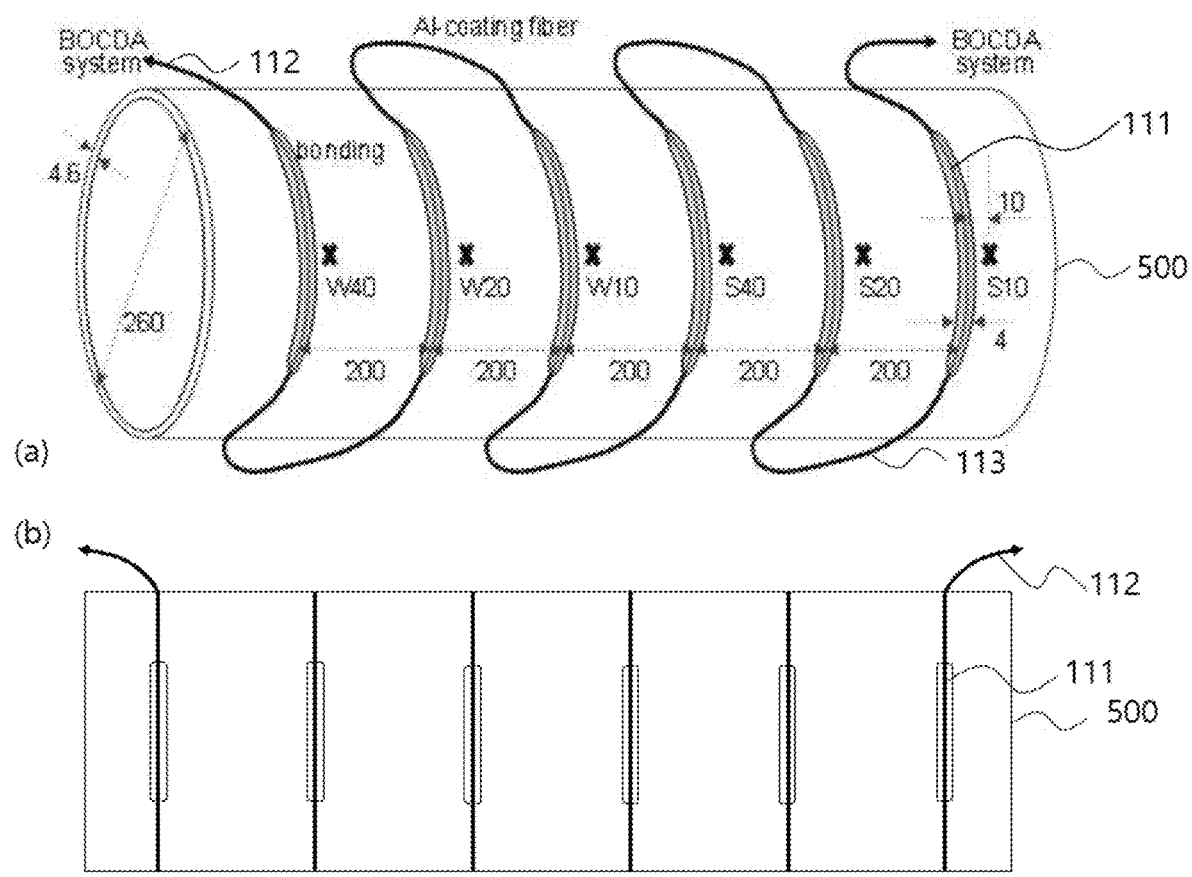

[FIG. 11]
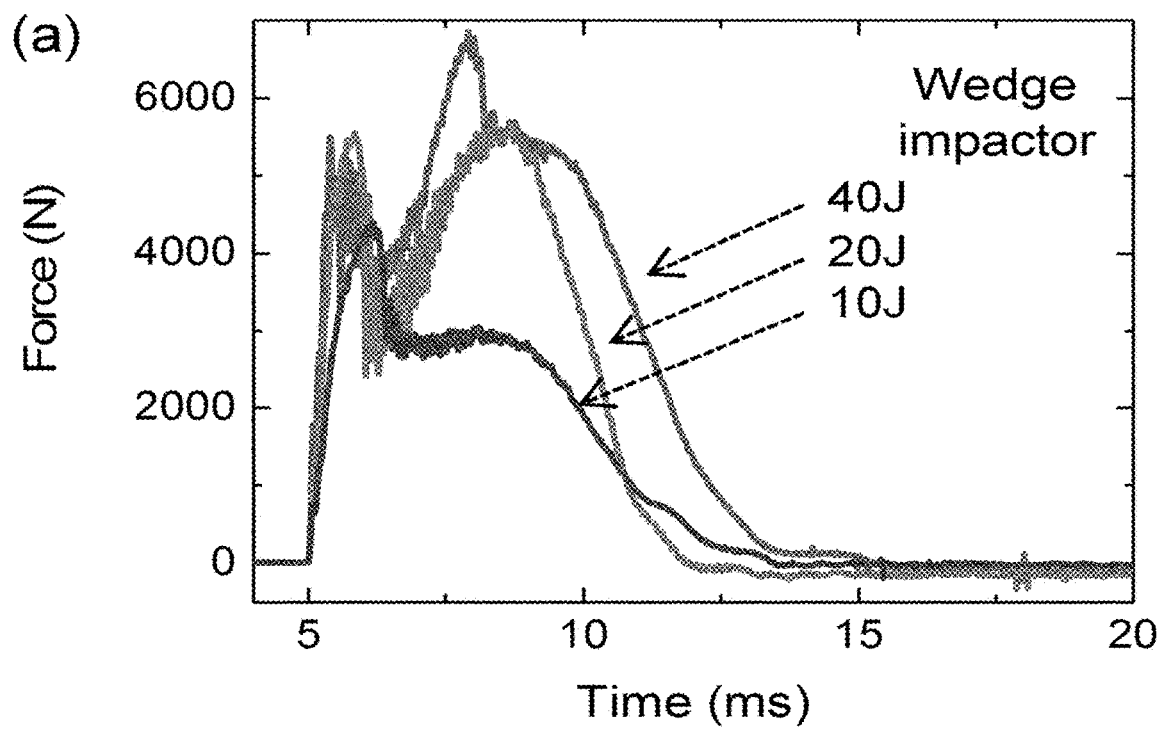
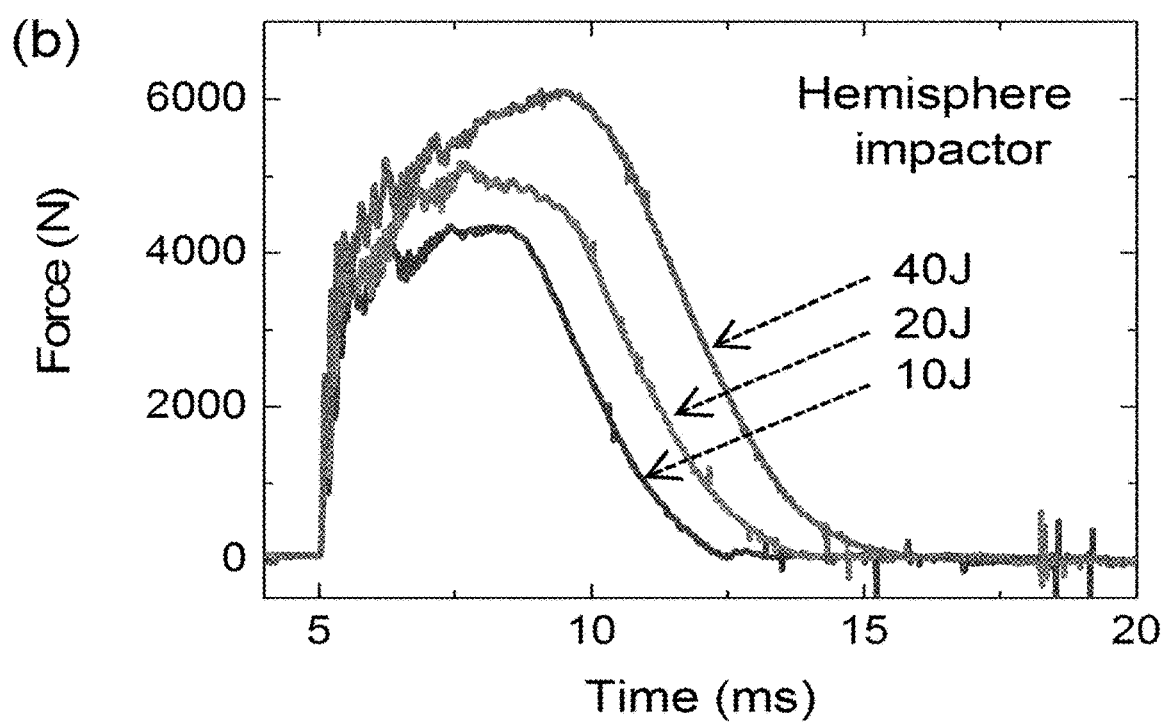

[FIG. 12]
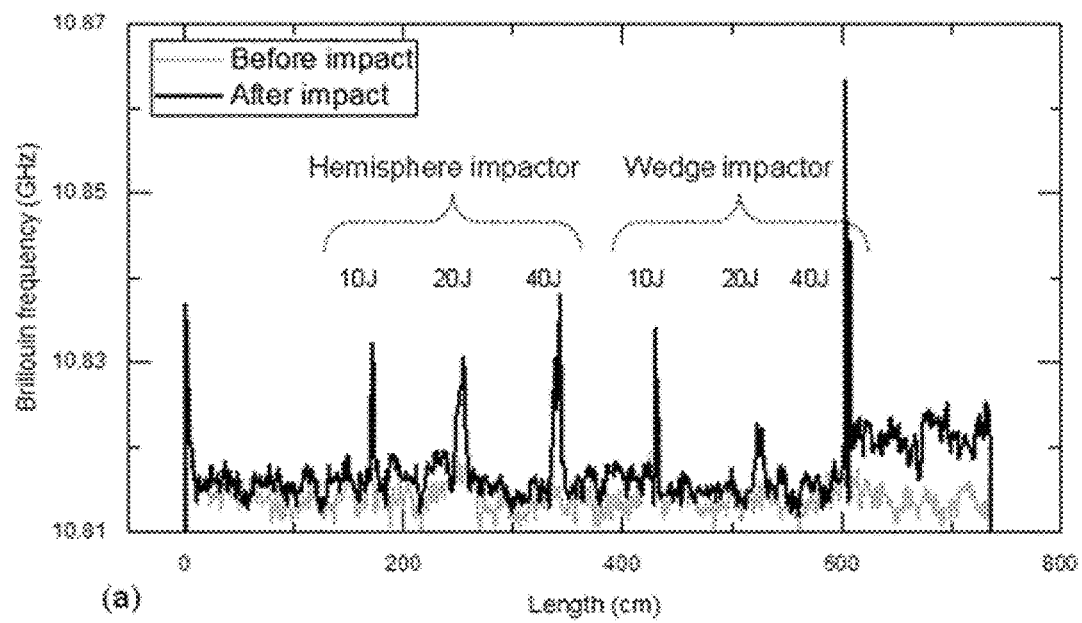
(a)
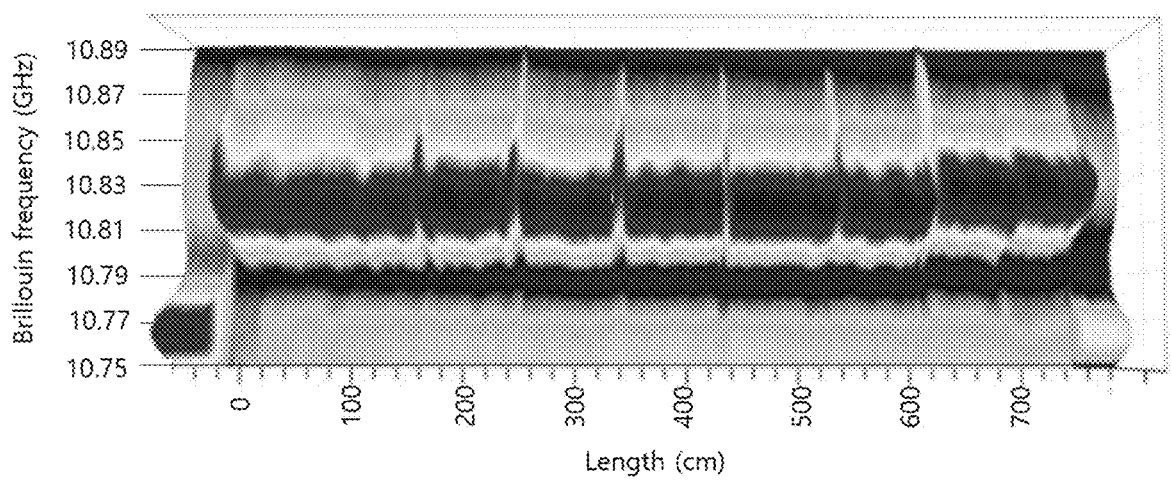
(b)

[FIG. 13]
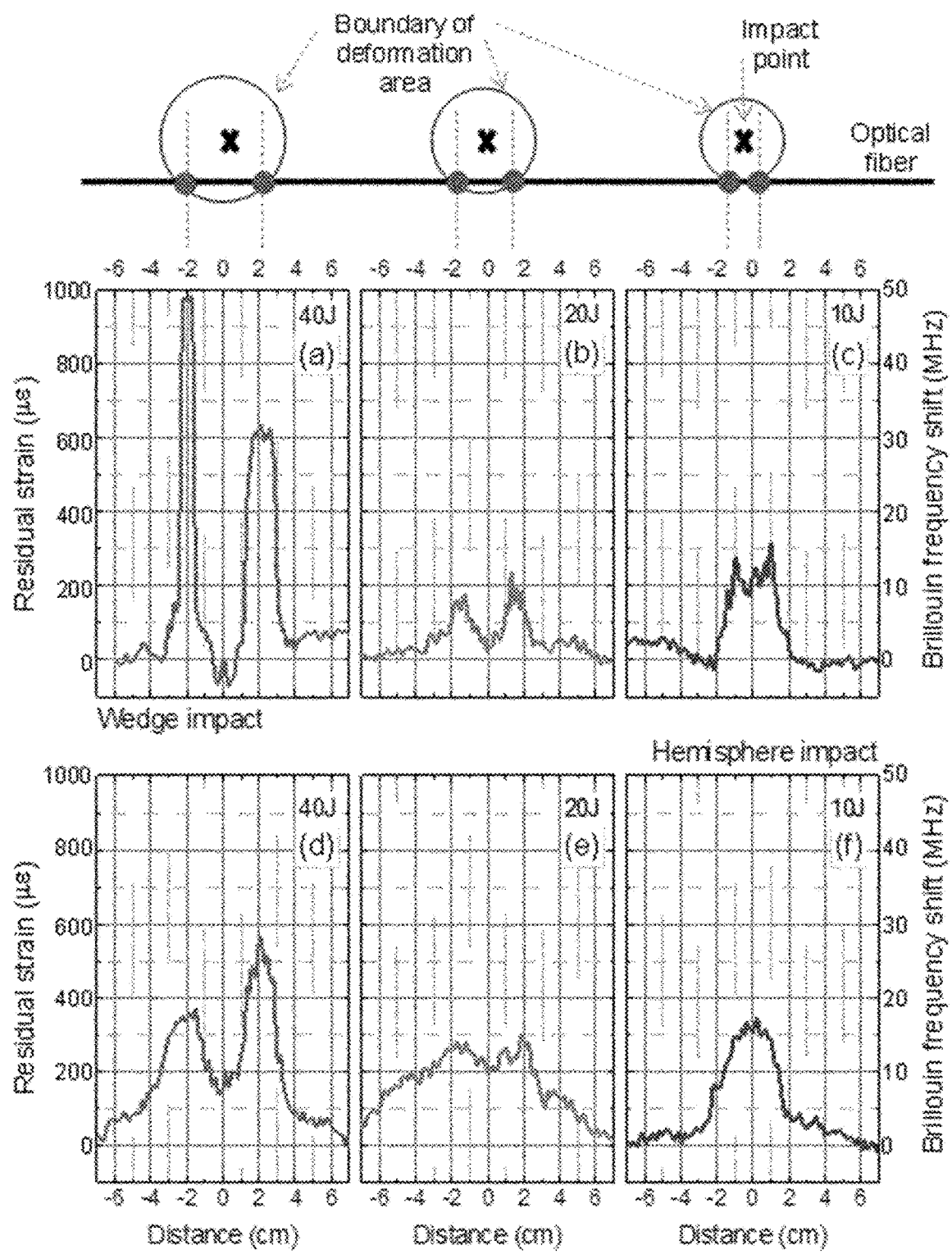

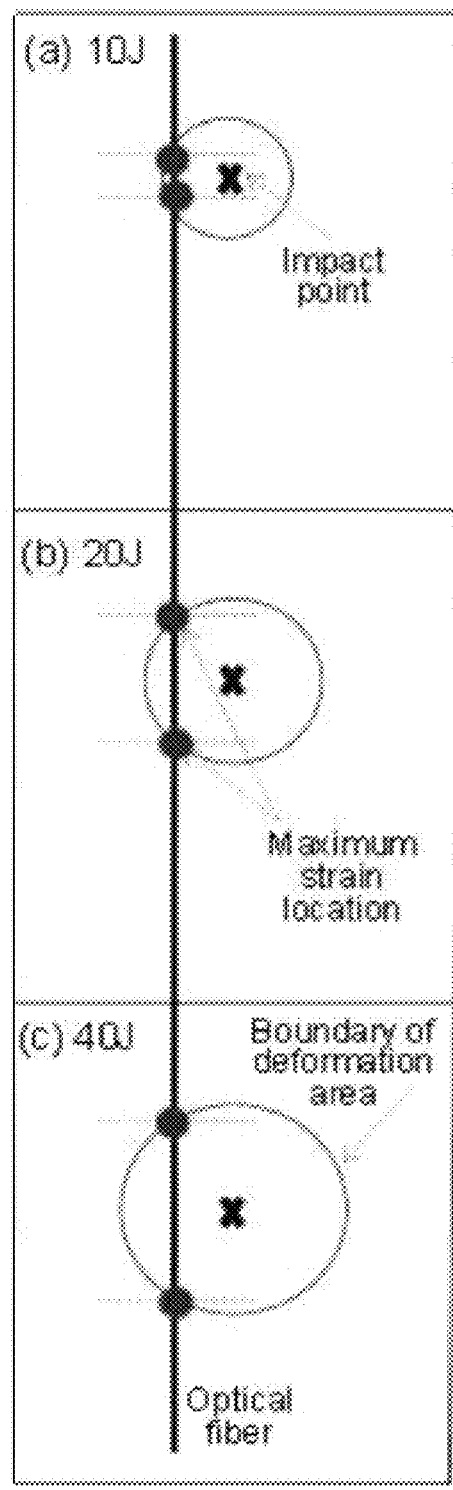
[FIG. 14]

[FIG. 15]
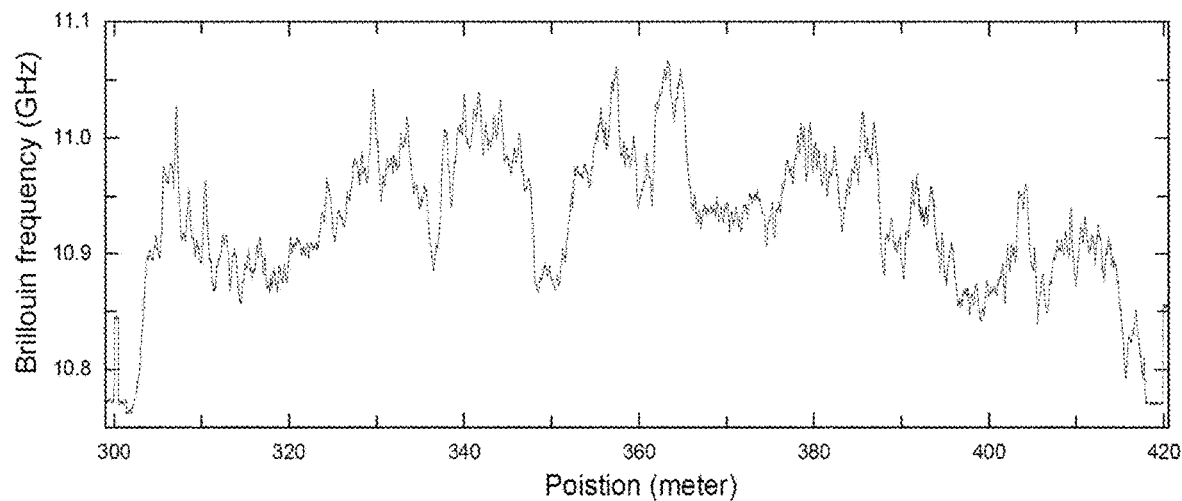
[FIG. 16]
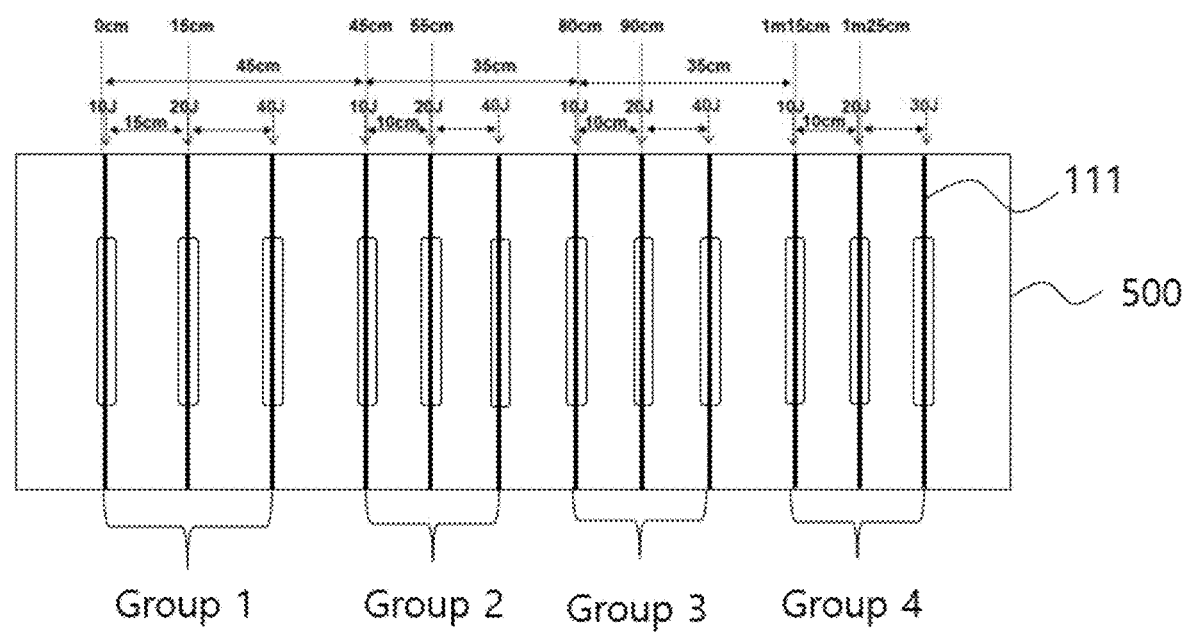

[FIG. 17]
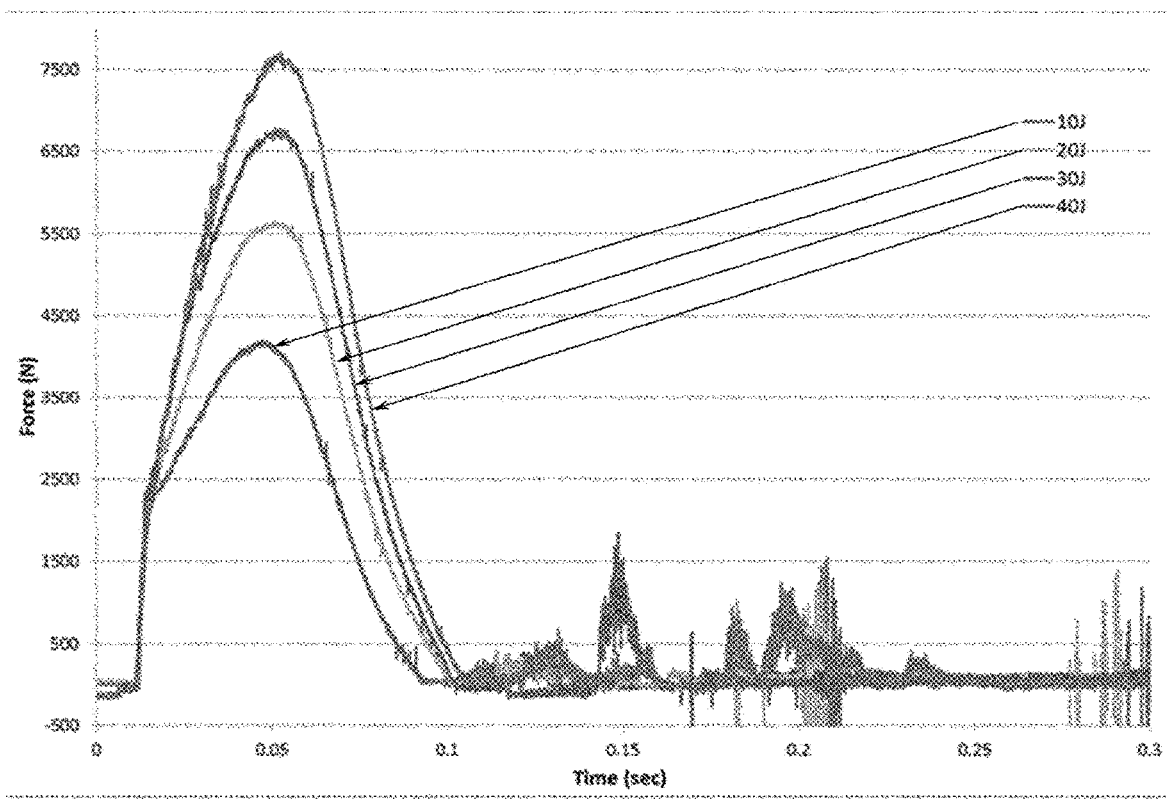

[FIG. 18]
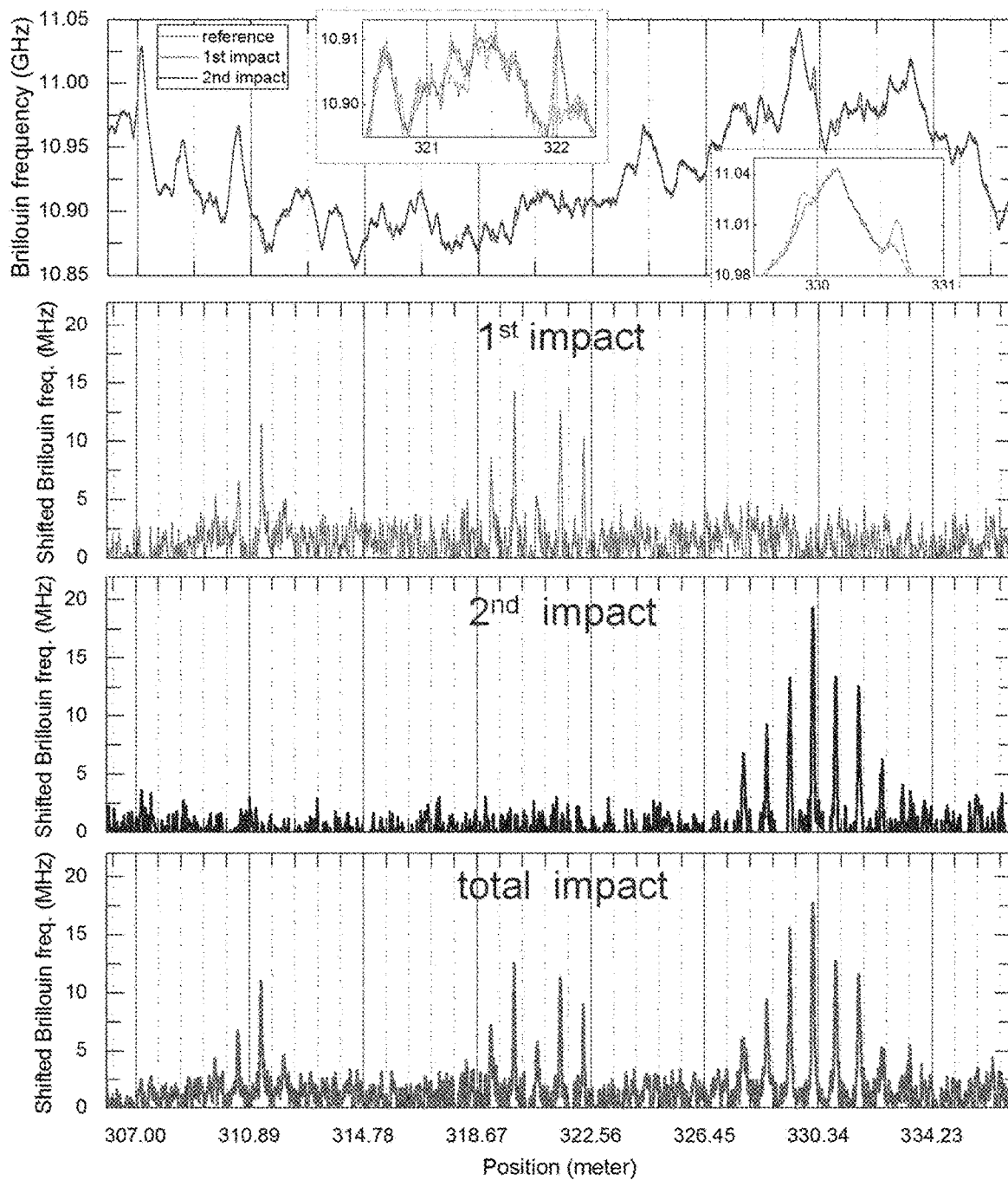

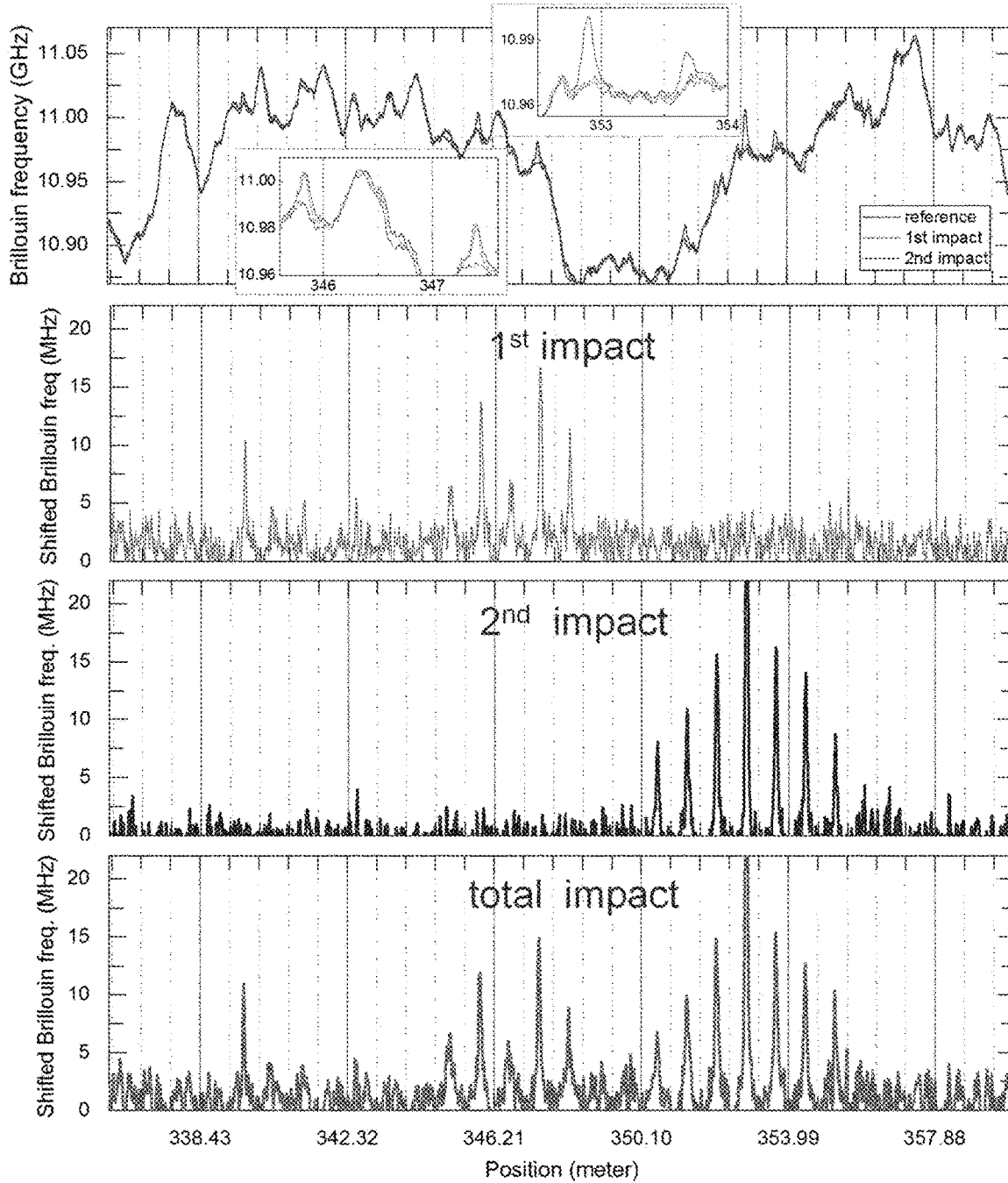
[FIG. 19]

[FIG. 20]
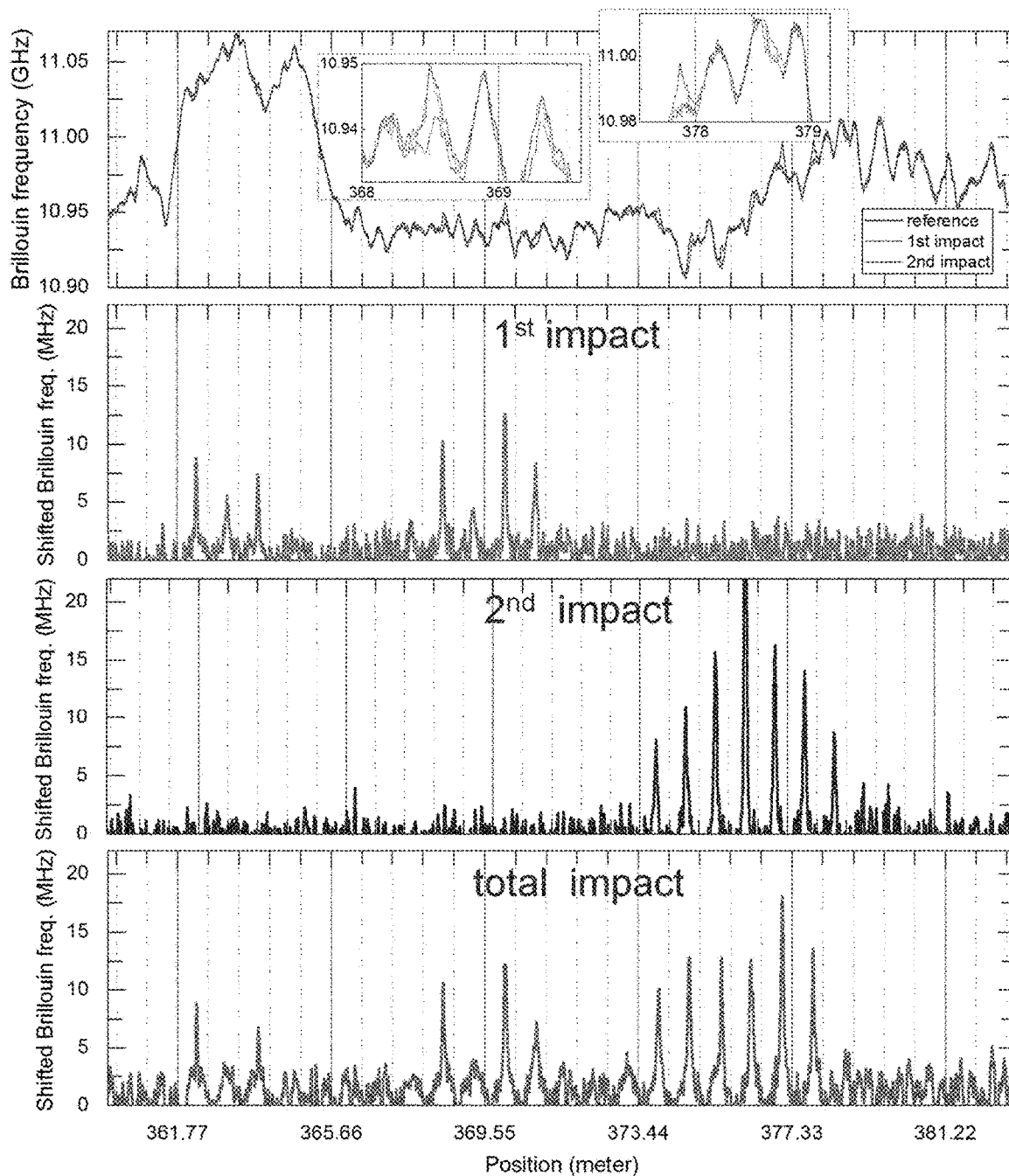

[FIG. 21]
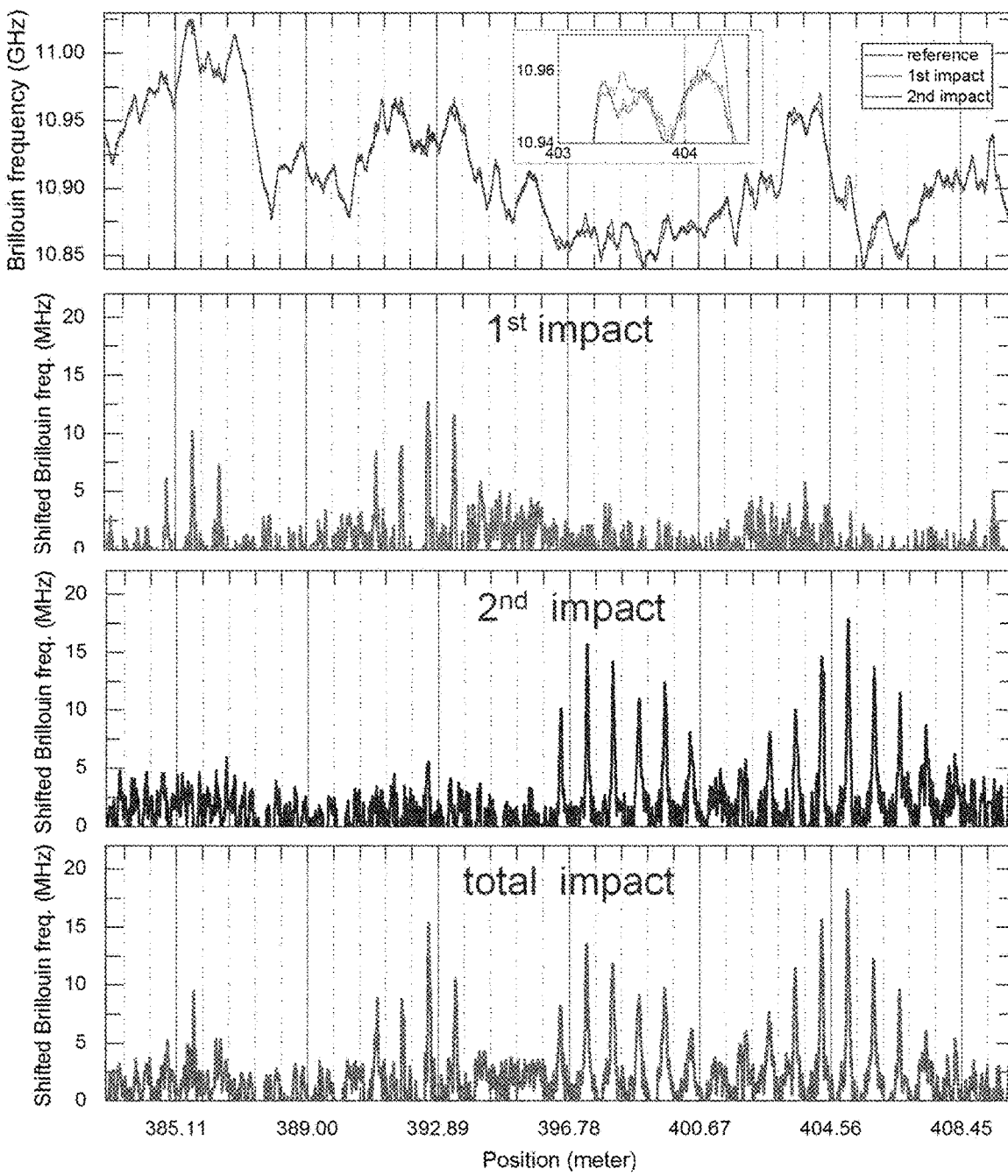

[FIG. 22]
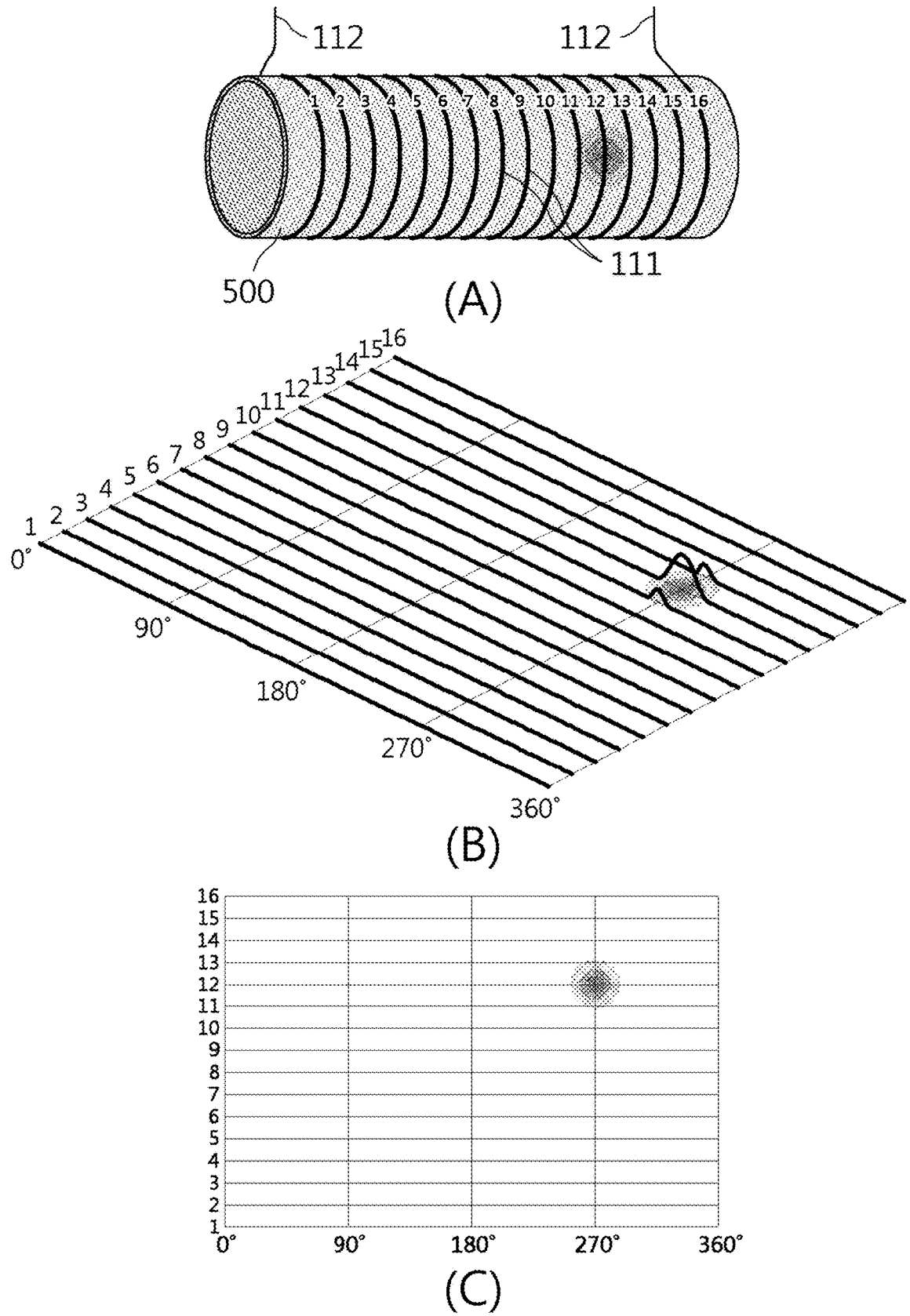

[FIG. 23]
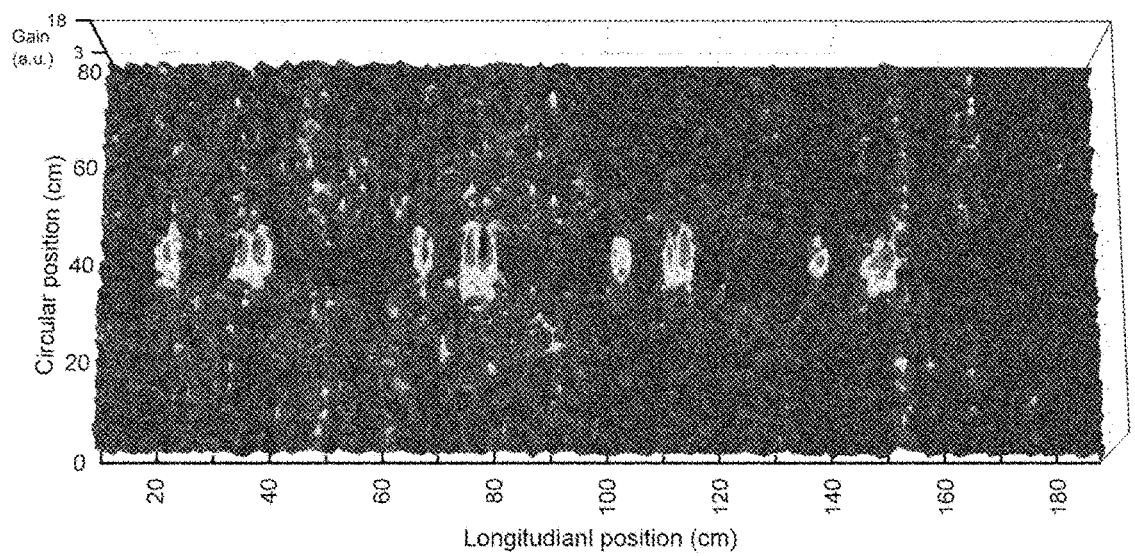
[FIG. 24]
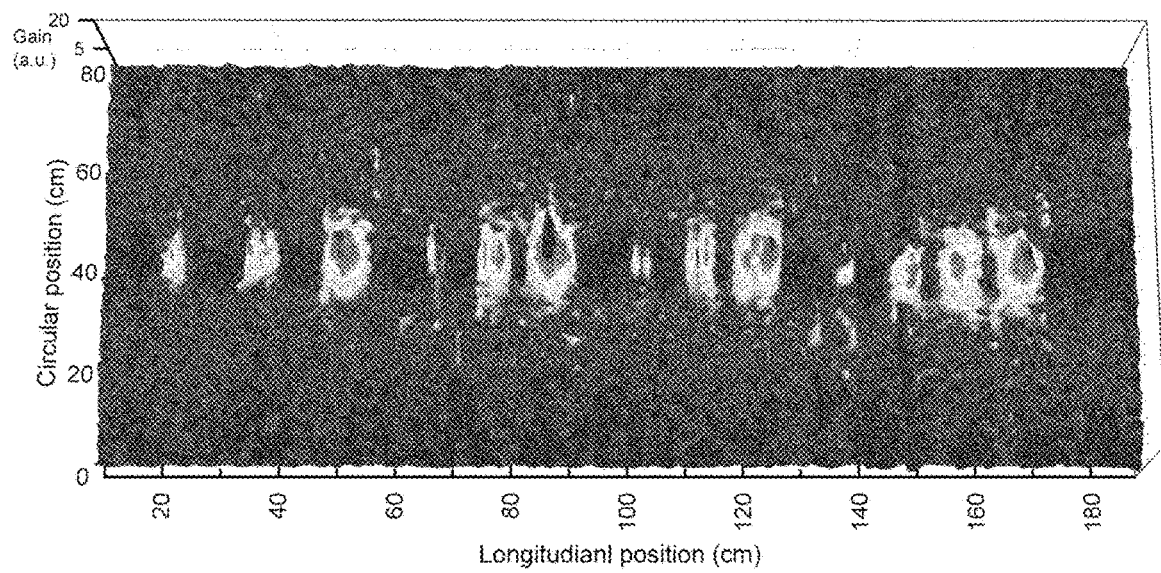

APPARATUS AND METHOD FOR DETECTING COMPOSITE MATERIAL DAMAGE DUE TO IMPACT BY USING DISTRIBUTED OPTICAL FIBERS

TECHNICAL FIELD

The present invention relates to an apparatus and a method for detecting composite material damage due to impact by using distributed optical fibers, and more particularly, to an apparatus and a method for detecting composite material damage due to impact by using distributed optical fibers, capable of essentially removing a need for power constantly supplied to operate a sensor and the like, and simultaneously capable of effectively and economically detecting the position and level of damage due to low-velocity impact on a composite material structure, in detecting the damage due to the impact on the composite material structure for monitoring its structural health.

BACKGROUND ART

A composite material may refer to a material that is a composite of two or more types of materials in the broadest sense, a material in which two or more types of materials are combined with each other to have a more superior performance than the original materials while maintaining the original phase of each material physically or chemically. Nowadays, the composite material may be generally made by adding a reinforcement material made of glass fibers or carbon fibers to a base material made of various metal materials and resin materials. Such a composite material may be light weight, have high strength, have high rigidity and have high fatigue resistance, and thus has been very actively used in aerospace and automobile fields in particular.

Detection of damage due to impact on such composite material may be a traditional research topic that has been conducted since the early days of its structural health monitoring research. Research teams in the field of aeronautical engineering in the United States and Europe have been conducting real-time monitoring research to detect the position and level of the damage due to the impact on the composite material structure. Meanwhile, the Korea Advanced Institute of Science and Technology (KAIST), the Korea Institute of Materials Science (KIMS) affiliated with the Korea Institute of Machinery and Materials (KIMM), and the like in the Republic of Korea have conducted a research using an optical fiber Bragg grating sensor for detecting the damage due to the impact on the composite material structure. In Korean Patent Laid-Open Publication No. 2009-0069069 (entitled "damage detection equipment and damage detection method for composite structure" and published on Jun. 29, 2009), the Korea Aerospace Research Institute (KARI) discloses a technique for determining the occurrence and level of the damage to the composite material structure by using a unique frequency generated by striking the composite material structure to be detected with a striker.

Meanwhile, the composite material may have excellent rigidity and strength, but may have low toughness and thus be easily damaged by impact. In particular, it is generally difficult to find damage due to low-velocity impact because it is not easily shown on an exterior of the composite material structure. The cost is increasing due to frequent monitoring of a structural defect in the composite material structure to solve deterioration in its structural reliability caused by the damage occurring due to the low-velocity impact and it is difficult to find the damage. However, the previous research described above, that is, the research on the conventional damage detection methods using a piezoelectric sensor, the optical fiber Bragg grating sensor or the like, is basically related to techniques for a real-time detection. Therefore, after the impact occurs, it is impossible to detect the damage to the composite material structure which is perfectly elastic. In addition, the previous research has a premise that the detection needs to be performed in real time at a moment in which the impact occurs. However, it is impossible to detect an event in which the damage due to the impact occurs in case that the sensor fails or some malfunctions at the moment in which the impact occurs in the actual field.

As described above, it may be difficult to find the damage due to the low-velocity impact on the composite material with the naked eye in a short term, and the damage level may be small. However, these small damages may affect safety of the material structure in a long term. Therefore, there is an urgent need for a technology capable of effectively and economically detecting the position and level of the composite material damage due to the low-velocity impact.

RELATED ART DOCUMENT

Patent Document

1. Korean Patent Laid-Open Publication No. 2009-0069069 (entitled "Damage detection equipment and damage detection method for composite structure" and published on Jun. 29, 2009)

DISCLOSURE

Technical Problem

An object of the present invention is to provide an apparatus for detecting composite material damage due to impact by using distributed optical fibers, capable of effectively and economically detecting the position and level of damage occurring in a composite material due to low-velocity impact by measuring a residual strain of the optical fibers distributed on a surface of the composite material or in the composite material, and a method for the same. Another object of the present invention is to provide an apparatus and a method for detecting the composite material damage due to the impact by using distributed optical fibers, capable of essentially removing a detection error due to the temporary failure, malfunction or the like of a sensor as well as a need for power constantly supplied to operate the sensor by allowing the sensor not to be operated constantly in real time.

Technical Solution

In one general aspect, an apparatus 100 for detecting composite material damage due to impact by using distributed optical fibers, detecting the position and level of the damage due to the impact on a detection target 500 made of a composite material in which a base material and a reinforcement material are mixed with each other, may include: a detector 110 including a detection line(s) 111 made of an optical fiber and distributed and disposed on the detection target 500 and a transmission line 112 made of the optical fiber and connected to the detection line 111 disposed at the outermost end of the distributed detection lines 111 for a signal to be transmitted between the detection line 111 and the outside; and an analyzer 120 connected to the detector 110 through the transmission line 112 and calculating the position and level of the damage due to the impact on the detection target 500 by measuring a residual strain of the detection line 111. Here, in case that there are the plurality of detection lines 111 independent from each other, the detector 110 may further include a connection line 113 made of the optical fiber and connecting the detection lines 111 to each other.

In more detail, the apparatus 100 for detecting composite material damage due to impact may calculate the position and level of the damage due to the impact on the detection target 500 by using a principle in which a Brillouin frequency shift value is proportional to a strain of the optical fiber in such a manner that: the Brillouin frequency shift value of the detection line 111 measured before the occurrence of the damage due to the impact is used as a reference value; the reference value is compared with the changed Brillouin frequency shift value of the detection line 111 measured after the occurrence of the damage due to the impact; and the residual strain of the detection line 111 after the occurrence of the damage due to the impact is calculated.

Here, the detector 110 may allow either the detection line 111 and the transmission line 112 or the detection line 111 and the transmission line 112 and the connection line 113 to form at least one connected line, and the detector 110 may include at least one unit line 115 in case that the unit line 115 indicates one connected line including either the detection line 111 and the transmission line 112 or the detection line 111, the transmission line 112 and the connection line 113.

In more detail, in the detector 110, the one unit line 115 may be formed as follows: when there is one detection line 111, the unit line 115 may be formed by including the transmission line 112-the detection line 111-the transmission line 112 which are sequentially connected to each other in order, and when the number of detection lines 111 is N (N is a natural number of two or more), the unit line 115 may be formed in such a manner that: the number N-1 of the connection line 113 is provided to connect two ends of the detection lines 111 adjacent to each other, and two transmission line 112s are provided to connect each ends of two detection lines positioned at the outermost ends such that the ends of detection lines are unconnected to the connection line, respectively; and the unit line 115 is formed by including the transmission line 112-the detection line 111-the connection line 113- . . . -the detection line 111-the transmission line 112, which are sequentially connected to each other in order.

In addition, the detector 110 may be disposed in such a manner that when the number of detection lines 111 is N (N is a natural number of two or more) in one unit line, a plurality of the detection lines 111 included in the one unit line 115 are extended in the same direction and spaced apart from each other in parallel. Here, in the detector 110, the extension direction of the detection line 111 may be formed to be the same as the extension direction of the reinforcement material forming the detection target 500 to which the detection line 111 is attached. In addition, in the detector 110, the detection lines 111 may be spaced apart from each other by the same distance.

Alternatively, in the detector 110, the one unit line 115 may be formed in such a manner that when there is one detection line 111, the detection target 500 has a column shape, and the detection line 111 is disposed to be wound around the detection target 500 to have some portions of the wound detection line 111 arranged to be spaced apart from each other in parallel.

In addition, the detection line 111 may be attached onto a surface of the detection target 500 or buried in the detection target 500. Here, in case that the detection line 111 is attached onto the surface of the detection target 500, the detection line 111 may be attached onto the surface of the detection target 500 by an adhesive. Alternatively, in case that the detection line 111 is buried in the detection target 500, the detection target 500 may be formed by stacking a plurality of layers 500a and 500b respectively made of a base material and a reinforcing material, and the detection line 111 may be interposed between the plurality of layers 500a and 500b configuring the detection target 500.

In addition, in the detector 110, the detection line 111 may include only the optical fiber, or further include a coating layer 111a formed on a surface of the optical fiber. Here, the coating layer 111a may be made of a metal material or a resin material.

In another general aspect, a method for detecting composite material damage due to impact, using a principle in which a Brillouin frequency shift value is proportional to a strain of the optical fiber and using a plurality of detection lines 111 made of optical fibers and distributed and arranged on a surface of a detection target 500 or in the detection target 500 for detecting the position and level of the damage due to the impact on a detection target 500 made of a composite material in which a base material and a reinforcement material are mixed with each other, may include: determining a reference in which each position of the detection lines 111 on the detection target 500 and each Brillouin frequency shift value of the detection lines 111 are measured in advance; generating the damage due to the impact in which the damage due to the impact on the detection target 500 is generated; measuring a strain in which the Brillouin frequency shift value of the detection line 111 is measured; and detecting the impact in which the position and level of the damage due to the impact on the detection target 500 are calculated by comparing the Brillouin frequency shift reference value obtained in the determining of the reference in advance with the Brillouin frequency shift measurement value measured in the measuring of the strain for each position obtained in the determining of the reference in advance, and then calculating a residual strain on the detection line 111 after occurrence of the damage due to the impact.

In addition, an outputting method of a result of detecting composite material damage due to impact by using distributed optical fibers of the present invention, i.e. an outputting method of a detection result detected by the method for detecting composite material damage due to impact as described above, may include: mapping an impact point of a detection line 111 by a point on a two-dimensional XY plane, respectively; and displaying a residual strain measured at each point of the detection line 111 as a Z height value or a shadow value at each point on the mapped two-dimensional XY plane.

Advantageous Effects

It is difficult to find damage due to low-velocity impact because it is not easily shown on an exterior of a composite material structure. However, according to the present invention, it is possible to very effectively and economically detect the occurrence and level of the damage due to the low-velocity impact in the composite material structure. In particular, this damage due to the low-velocity impact may cause deterioration in safety and reliability of the composite material structure in the long term. According to the present invention, it is possible to effectively detect such damage due to the low-velocity impact and use a detection result as a determination criteria on whether the composite material structure needs reinforcement, replacement or the like, thereby greatly improving the safety and reliability of the structure in the long term ultimately.

Meanwhile, a conventional technology for detecting the composite material damage due to the impact using a piezoelectric sensor, an optical fiber Bragg grating sensor or the like has a basic premise that the detection needs to be performed in real time. Therefore, it is impossible to detect the damage to the composite material which is perfectly elastic in case that the impact is not detected in real time. However, according to the present invention, even if the composite material itself is restored to its original shape after the impact, it is possible to easily detect the occurrence and level of the damage due to the impact in the composite material by measuring a residual strain of optical fibers distributed on a surface of the composite material or in the composite material, thereby fundamentally solving the problem of the real-time detection technology as described above.

In addition, according to the present invention, there is no need for damage detection in real time detection, and it may thus be possible to essentially remove a detection error due to the temporary failure, malfunction or the like of a sensor, reduced accuracy of the damage detection and the like as well as problems of the conventional technology for detecting the damage in real time, that is, the constant power supply to the sensor and the resulting power loss.

DESCRIPTION OF DRAWINGS

FIG. 1 shows an embodiment of an apparatus of the present invention for detecting composite material damage due to impact.

FIG. 2 shows a detection principle of a Brillouin frequency shift.

FIGS. 3 and 4 show a detection principle of the apparatus of the present invention for detecting composite material damage due to impact.

FIG. 5 shows an embodiment in which a detector is disposed.

FIG. 6 shows another embodiment in which a detector is disposed.

FIG. 7 shows optical fibers installed on a composite pressure vessel made of carbon fiber: (a) shows a condition in which the optical fibers are installed; and (b) shows a view in which the optical fibers are installed.

FIG. 8 shows a comparison of the Brillouin frequency variation due to impacts occurring in each of an aluminum-coated optical fiber, a polyimide-coated optical fiber and a standard SMF (single-mode optical fiber).

FIG. 9 shows a Brillouin frequency variation of a case in which the three types of optical fibers, such as the aluminum-coated optical fiber, the polyimide-coated optical fiber and the standard SMF, receive the impacts with energies of 40 J, 20 J and 10 J, respectively.

FIG. 10 shows an aluminum-coated optical fiber adhered to a composite pressure vessel and around the vessel.

FIG. 11 shows a force graph by a wedge impactor and a force graph by a hemisphere impactor, respectively.

FIG. 12 shows (a) a Brillouin gain graph and (b) the Brillouin frequency variation extracted from the gain graph.

FIG. 13 shows graphs of the Brillouin frequency variation obtained at respective impact points based on impact energies of 10 J, 20 J and 40 J.

FIG. 14 shows views of the moments in which the structure is strained due to impacts applied by the hemisphere impactor having impact energies of 10 J, 20 J and 40 J, respectively.

FIG. 15 shows the Brillouin frequency distribution of a SMF (single-mode fiber) with uncontrolled tensile force on a composite combustion tube.

FIG. 16 shows the position and energy level of an impact applied to a SMF (single-mode fiber) on a composite combustion tube.

FIG. 17 shows an impact load curve on a SMF (single-mode fiber) on a composite combustion tube.

FIG. 18 shows the experimental result of an impact applied to a SMF (single-mode fiber, Group 1) on a composite combustion tube.

FIG. 19 shows the experimental result of an impact applied to a SMF (single-mode fiber, Group 2) on a composite combustion tube.

FIG. 20 shows the experimental result of an impact applied to a SMF (single-mode fiber, Group 3) on a composite combustion tube.

FIG. 21 shows the experimental result of an impact applied to a SMF (single-mode fiber, Group 4) on a composite combustion tube.

FIG. 22 shows a conceptual diagram of the principle of outputting the position and level of an impact.

FIG. 23 shows the position and level of an impact applied to a SMF (single-mode fiber) on a composite combustion tube (with loads of 10 J and 20 J).

FIG. 24 shows the position and level of an impact applied to a SMF (single-mode fiber) on a composite combustion tube (with loads of 10 J, 20 J, 30 J and 40 J).

| ** Detailed Description of Main Elements ** | |
|---|---|
| 100: apparatus for detecting composite material damage due to impact | |
| 110: detector | 111: detection line |
| 111a: coating layer | 112: transmission line |
| 113: connection line | 115: unit line |
| 120: analyzer | |
| 500: detection target | |
| 500a: first layer | 500b: second layer |

BEST MODE

Hereinafter, an apparatus and a method for detecting composite material damage due to impact by using distributed optical fibers having the above-described configuration according to the present invention are described in detail with reference to the accompanying drawings.

Apparatus of Present Invention for Detecting Composite Material Damage Due to Impact: Overall Composition and Detection Principle FIG. 1 shows an embodiment of an apparatus of the present invention for detecting composite material damage due to impact. As described above, an apparatus 100 of the present invention for detecting composite material damage due to impact may detect the position and level of the damage due to the impact on a detection target 500 made of a composite material in which a base material and a reinforcement material are mixed with each other. In more detail, the composite material which is perfectly elastic may be restored to its original shape even after occurrence of the impact over time, and it may thus be difficult to detect occurrence of the impact in case that the impact is not detected in real time at a moment in which the impact occurs. It may be possible to easily detect whether or not the impact occurs in case that the level (size) of the impact is significantly large and occurrence of damage due to this impact is thus easily identified with the naked eye. However, damage due to low-velocity impact may have a low level, thereby making it difficult to detect whether the impact itself occurs. The apparatus of the present invention may solve this problem, and may effectively and economically detect the position and level of the damage which occurs due to the low-velocity impact even though the occurrence of which is difficult to be found. The apparatus of the present invention for detecting the composite material damage due to the impact may include a detector 110 and an analyzer 120 as shown in FIG. 1. A detailed description of each component is provided below.

The detector 110 may include a detection line 111 and a transmission line 112, and may further include a connection line 113. The detection line 111 may be made of an optical fiber and distributed and disposed on the detection target 500. The transmission line 112 may also be made of the optical fiber and connected to the detection line 111 disposed at the outermost end of the distributed detection lines 111 for a signal to be transmitted between the detection line 111 and the outside by the transmission line 112. Here, the connection line 113 may not be necessarily required in case that there is one detection line 111. However, the detector 110 may include the connection line 113 in case that there are the plurality of detection lines 111 independent from each other, and in this case, the connection line 113 may also be made of the optical fiber and connect the detection lines 111 to each other.

All of the detection line 111, the transmission line 112 and the connection line 113 may be made of an optical fiber, respectively. Here, the detector 110 may have a shape of a long single optical fiber which is originally integrated as a whole piece, or have a shape in which individual optical fibers separated from each other may be bonded to each other by a technique of bonding the optical fibers together. A specific configuration of the detector 110 is described in more detail below.

The analyzer 120 may be connected to the detector 110 through the transmission line 112, and calculate the position and level of the damage due to the impact on the detection target 500 by measuring a residual strain of the detection line 111. In more detail, the apparatus 100 of the present invention for detecting the composite material damage due to the impact may detect the damage due to the impact by using a principle in which a Brillouin frequency shift value is proportional to a strain of the optical fiber.

FIG. 2 is a view for briefly describing a detection principle of a Brillouin frequency shift. Brillouin scattering may refer to a phenomenon in which light interacts with a sound wave generated in a material and is scattered at a frequency different from that of incident light, and the Brillouin frequency shift may refer to a difference in the frequencies. As shown in FIG. 2A, pumping pulse light and frequency-sweeping CW (continuous-wave) probe light may be incident on both ends of the optical fiber to be tested (test fiber), respectively. Here, $v_P$ may refer to the optical frequency of the pumping pulse light, $v_{CW}$ may refer to the optical frequency of the probe light and $\Delta_v$ may refer to the optical frequency difference between the two lights $v_P$-$v_{CW}$. The optical frequency may be adjusted so that the optical frequency difference $\Delta_v$ coincides with the Brillouin frequency shift value $v_B$ of the test optical fiber. In this case, the pumping pulse light may convert its light energy into the frequency-sweeping CW probe light by induction of the Brillouin scattering, and the frequency-sweeping CW probe light may amplify the Brillouin light in the optical fiber to be measured. The optical signal of the amplified frequency-sweeping CW (continuous-wave) probe light may be converted into an electrical signal by a PD (photodetector) and thus be measured.

The Brillouin frequency shift value may be greatly influenced not only by the material through which the light travels, that is, the optical fiber, but also be changed based on the strain applied to the optical fiber. When $\Delta_\epsilon$ refers to the strain of the optical fiber due to external stress, $\Delta T$ refers to a temperature change, a change amount $\Delta v_B$ of the Brillouin frequency shift value may be expressed by the following equation. In the following equation, a strain conversion factor $C_\epsilon$ and a temperature conversion factor $C_T$ have known values, respectively. However, in order to increase its accuracy, it is more preferable to use the values by accurately examining them based on actual application conditions.

$$\Delta v_B = C_\epsilon \cdot \Delta_\epsilon + C_T \cdot \Delta T$$

As shown in the above equation, when there is no influence of the temperature change, the change amount of the Brillouin frequency shift value may be proportional to the strain of the optical fiber. A shape strain of a certain optical fiber may occur in the following case: that is, a change occurs in the Brillouin frequency shift value when the Brillouin frequency shift value is measured again by injecting the pumping pulse light and the frequency-sweeping probe light into the optical fiber after measuring the Brillouin frequency shift value of the optical fiber in advance and allowing the optical fiber to be attached to or buried in a desired object. It may be obvious that the strain of the optical fiber is due to the strain of the object which the optical fiber is attached to or buried in. In addition, as described above, the change amount of the Brillouin frequency shift value may be proportional to the strain of the optical fiber. Therefore, it is possible to detect the strain of the optical fiber and also the strain of the object from the change amount of the Brillouin frequency shift value. FIG. 2B is a graph showing a change in an electrical signal (Intensity) and a change pattern of a strain (Strain) based on the Brillouin frequency shift with respect to difference in a position (Distance) and optical frequency (Frequency) irradiated on a large structure including the optical fiber using the above-described principle.

In this manner, the present invention may measure the strain of the optical fiber by measuring the Brillouin frequency shift value of the optical fiber, thereby ultimately detecting the position and level of the composite material damage due to the impact. In particular, the method of the present invention is completely different from a conventional method for detecting the impact in real time by using a piezoelectric sensor or a FBG (fiber Bragg grating) sensor. The conventional method for detecting the impact in real time may detect the impact only when the sensor is operated at the moment in which the impact occurs, and may be unable to detect the impact at that moment in case that the sensor fails or power is not supplied to the sensor at the moment in which the impact occurs, etc. Meanwhile, the composite material structure may be restored to its original shape over time even if its shape is strained due to the impact because the composite material is completely elastic. However, in case of failing to detect the occurrence of the impact at the moment in which the impact occurs, the conventional method for detecting the impact in real time may be unable to detect whether the impact itself occurs (because the composite material is restored to its original shape over time after the impact occurs). However, the present invention has no object to perform such a real-time detection at all. The present invention may not only detect the occurrence of the impact even after the moment in which the impact occurs, but also the position and level of the impact. This detection method is described in more detail through FIG. 3 as follows.

FIG. 3 is a view for explaining a detection principle of the apparatus 100 of the present invention for detecting composite material damage due to impact. As described above, the apparatus of the present invention for detecting the composite material damage due to the impact may include the detector 110 which is made of the optical fiber. FIG. 3A shows an example in which the detector 110 is attached onto a surface of the detection target 500 made of the composite material. As shown in FIG. 3A, the detection line 111 may be a portion of the detection target 500 to which the optical fiber is attached. The detection line 111 may include only the optical fiber, but may further include a coating layer 111a formed on a surface of the optical fiber as shown in FIG. 3A. The coating layer 111a may be made of a metal material such as aluminum or a resin material such as polyimide.

FIG. 3A shows a state in which the impact is yet to occur, and the Brillouin frequency shift value of the detection line 111 is not changed when compared with a reference value obtained from a measurement in advance. It may be assumed that a predetermined detection region having a length $L_0$ is determined in an initial state in which any impact is yet to occur. Here, the strain of the detection region may be $(L_0-L_0)/L_0=0$ as shown in an equation shown in FIG. 3A.

FIG. 3B shows a state at a moment immediately after the impact occurs using an impactor. Both the detection line 111 and the detection target 500 may be greatly strained at a position where the impact occurs. In particular, a length of the detection region of the detection line 111 may be changed to $L_{max}$, and the strain of the detection region may have the same value as that in the equation, $(L_{max}-L_0)/L_0=\varepsilon_{max}$, as shown in FIG. 3B.

FIG. 3C shows a state in which some time passes from the moment at which the impact occurs. As described above, the detection target 500 may be made of the composite material which is completely elastic, and the material may thus be restored to its original shape over time as shown in FIG. 3C after the impact occurs. (Even though its shape is restored as shown in FIG. 3C, a crack may be formed in a direction in which the impact spreads in the detection target 500, and a crack may also be formed between its layers). In a state in which its shape is restored as such, it may be impossible to substantially detect or sense a small amount of damage due to the impact even though the impact occurs in the composite material structure. However, as shown in FIG. 3C, even if the detection target 500 is completely restored to its original shape, a strain may remain in the detection line 111 of the present invention. Even though it may be smaller than the maximum strain at the time in which the impact occurs, significant residual strain may occur to make it clear that the impact occurs. The detection line 111 is not made of the composite material, and thus it is unable to be completely restored to its original shape even if more time passes. Therefore, this residual strain may be measured easily even if it is measured long after the impact occurs. In this case, a length of the detection region of the detection line 111 may be changed to $L_{res}$, and here, the strain of the detection region may have the same value as that in the equation, $(L_{res}-L_0)/L_0=\varepsilon_{res}$, as shown in FIG. 3C.

Meanwhile, as shown in FIG. 3, the detection line 111 may be in close contact with the detection target 500. Therefore, in a process in which the detection target 500 is restored to its original shape, the detection line 111 may also be partially restored due to its influence, and the residual strain may thus be reduced. However, as shown in FIG. 3, in case that the coating layer 111a is formed on the detection line 111, the coating layer 111a may absorb and offset restoration effect of the detection target 500 by some degree, and the residual strain formed in the detection line 111 may thus be better preserved.

As described above, the change amount of the Brillouin frequency shift value may be proportional to the strain of the optical fiber. As described in FIG. 3C, the Brillouin frequency shift value of the detection line 111 measured before the occurrence of the damage due to the impact may be used as a reference value. If the reference value is compared with the changed Brillouin frequency shift value of the detection line 111 measured from the position and level of the damage after the occurrence of the damage due to the impact, it is possible to calculate the residual strain in the detection line 111 after the occurrence of the damage due to the impact. The position where the residual strain occurs in the detection line 111 may be the position of the damage due to impact on the detection target 500, and if a size of the residual strain occurring in the detection line 111 is converted to an energy level of the impact, this level may be the level of the damage due to impact on the detection target 500. That is, it is possible to easily calculate the position and level of the damage due to the impact on the detection target 500 by calculating the residual strain of the detection line 111.

FIG. 4 is similar to FIG. 3, but shows that the detection line 111 is buried in the detection target 500. In this case, if a volume of the detection line 111 becomes too large, there is a risk in which the shape strain of the detection target 500 may occur due to the detection line 111 buried therein. Therefore, in this case, it may be preferable that the coating layer 111a is not formed in the detection line 111. If the detection line 111 is sufficiently thin and the coating layer 111a is also sufficiently thin, the coating layer 111a may be formed in the detection line 111.

Even in this case, the principle of forming the residual strain may be similar to that of FIG. 3. As shown in FIG. 4C, after the impact occurs in the detection target 500, even though its shape is restored, a crack may be formed in a direction in which the impact spreads in the detection target 500, and a crack may also be formed between its layers. Accordingly, even though the detection target 500 is restored to its original shape, the detection line 111 may remain in its strained state to some extent. Therefore, in this case, the residual strain may also be easily measured.

Method of Present Invention for Detecting Composite Material Damage Due to Impact The following is a summary of a method of the present invention for detecting composite material damage due to impact based on the above-described principle. In describing the apparatus 100 of the present invention for detecting the composite material damage due to the impact, the apparatus of the present invention is described to include the detector 110 (including the detection line 111, the transmission line 112 and the connection line 113) and the analyzer 120. Here, the plurality of detection lines 111 may be fundamental means for substantially detecting the position and level of the damage due to the impact, and hereinafter, only the detection line(s) 111 may be cited in the description to describe the method of the present invention. The method of the present invention described below may be realized using the apparatus of the present invention described above, and in this case, it may be possible to achieve the most effective realization.

The method of the present invention for detecting the composite material damage due to the impact, using a plurality of detection lines 111 made of optical fibers and distributed and arranged on a surface of a detection target 500 or in the detection target 500, may include: determining a reference, generating the damage due to the impact, measuring a strain and detecting the impact.

In the determining of the reference, each position of the detection lines 111 on the detection target 500 and each Brillouin frequency shift value of the detection line 111 may be measured in advance. This value may be obtained as the reference value, and may be a reference for a comparison with a value measured after a subsequent strain occurs.

In the generating of the damage due to the impact, the damage due to the impact may be generated on the detection target 500. At a laboratory level, this may be a step in which the experimenter intentionally generates a pre-designed impact. That is, in this case, the position and level of the impact may be pre-designed and known values. At the laboratory level, the experimenter may compare information on the impact known in advance with information detected using the detection line 111, thereby confirm whether the apparatus is properly operated. However, in consideration of a case in which the apparatus and method of the present invention are applied to an actual field, the impact generated in the generating of the damage due to the impact may not be the impact intentionally generated by the experimenter, but the impact occurs at a moment in which the experimenter is unaware of its occurrence. That is, in the actual field, the occurrence of the impact may be noticed later depending on whether any change occurs in the steps described below and cannot be informed in advance. As described before, the conventional method for detecting the impact in real time may be unable to detect the occurrence of the impact even in the future if the impact occurs while the experimenter is unaware of its occurrence (for a reason such as a sensor malfunction). However, the apparatus and method of the present invention may easily detect any damage due the impact, even in a case in which it is an unknown impact with no information at all.

As such, whether it is the pre-designed impact in the laboratory or the unknown impact in the field, it may be assumed that the damage occurs in the generating of the damage due to the impact, and then the Brillouin frequency shift value of the detection line 111 may be measured in the measuring of the strain.

Finally, in the detecting of the impact, the position and level of the damage due to the impact on the detection target 500 may be calculated by comparing the Brillouin frequency shift reference value obtained in the determining of the reference in advance with the Brillouin frequency shift measurement value measured in the measuring of the strain for each position obtained in the determining of the reference in advance, and then calculating a residual strain on the detection line 111 after occurrence of the damage due to the impact.

Apparatus of Present Invention for Detecting Composite Material Damage Due to Impact: Specific Configuration of Detector As described above, the apparatus 100 of the present invention for detecting the composite material damage due to the impact may distribute and dispose the detection line 111 made of the optical fiber on the detection target 500, calculate the residual strain of the detection line 111 (by measuring a change in the Brillouin frequency shift value of the detection line 111), and calculate the position and level of the damage due to the impact on the detection target 500 therefrom. Here, it is possible to design various modifications in the disposition and the like of the detector 110 to more effectively calculate the position and level of the damage due to the impact on the detection target 500. Hereinafter, the description describes a detailed configuration of the detector 110 in more detail, and various embodiments in which the detector 110 is disposed.

First, the configuration of the detector 110 may be described more specifically and clearly as follows. As described above, the detector 110 may include either the detection line 111 and the transmission line 112 or the detection line 111, the transmission line 112 and the connection line 113. Here, the detector 110 may allow either the detection line 111 and the transmission line 112 or the detection line 111 and the transmission line 112 and the connection line 113 to form at least one connected line. In more detail, the detector 110 may include at least one unit line 115 in case that the unit line 115 indicates one connected line including either the detection line 111 and the transmission line 112 or the detection line 111, the transmission line 112 and the connection line 113.

In the embodiments shown in FIGS. 1 and 3, the detector 110 may include only one unit line 115. However, the detector 110 may not be necessarily made of only one unit line 115, and the detector 110 may include a plurality of unit lines 115 if necessary. FIG. 5 shows an embodiment in which the detector 110 is disposed to include two unit lines 115.

In detail, the configuration of the unit line 115 may be described as follows. To describe the one unit line 115 when there is one detection line 111, the unit line 115 may be formed by including the transmission line 112-the detection line 111-the transmission line 112 which are sequentially connected to each other in order. Alternatively, as shown in FIGS. 1, 3, 4, 5, etc., to describe one unit line 115 when the number of detection lines 111 is N (N is a natural number of two or more), the number N-1 of the connection line 113 may be provided to connect two ends of the detection lines 111 adjacent to each other, and two transmission lines 112 may be provided to allow the connection line 113 to be connected to an unconnected pair of detection lines 111 positioned at the outermost ends, respectively. Therefore, as shown in FIGS. 1, 3, 4, 5, etc., the unit line 115 may be formed by including the transmission line 112-the detection line 111-the connection line 113- . . . -the detection line 111-the transmission line 112 which are sequentially connected to each other in order. As described above, all of the detection line 111, the transmission line 112 and the connection line 113 may be made of the optical fiber. Here, the unit line 115 formed by connecting these lines to each other may have a shape of a long single optical fiber which is originally integrated as a whole piece, or have a shape in which individual optical fibers separated from each other may be bonded to each other by a technique of bonding the optical fibers together.

Meanwhile, FIGS. 1 and 3 show an embodiment in which the detection line 111 is attached onto the surface of the detection target 500, and FIGS. 4 and 5 show an embodiment in which the detection line 111 is buried in the detection target 500.

As shown in FIGS. 1 and 3, it may be the easiest and most economical to attach the detection line 111 to the surface of the detection target 500, and the detector 110 may be attached to the detection target 500 by an adhesive. In addition, any other means may be used such as an adhesive tape or the like, as long as the detection line 111 is firmly in close contact with the detection target 500 and thus the detection line 111 can be strained corresponding to the strain of the detection target 500.

When buried in the detection target 500 as shown in FIGS. 4 and 5, the detection line 111 may be buried based on a configuration property of the detection target 500. In the present invention, the detection target 500 is the composite material, and in detail, may be formed by stacking a plurality of layers 500a and 500b respectively made of a base material and a reinforcing material. The detection line 111 may be interposed between the plurality of layers 500a and 500b configuring the detection target 500, as shown in FIG. 5. FIG. 5 shows that an upper unit line 115 may be attached onto the surface of the detection target 500, and a lower unit line 115 may be buried in the detection target 500.

Meanwhile, the detection line 111 may be formed in a line shape, and thus it may be possible to specify a position where the strain occurs along an extension direction of the detection line 111 when the strain (that is, the damage due to the impact) occurs. Here, in order to more easily and effectively identify the position of the damage due to the impact on the detection target 500, it may be necessary to efficiently distribute and arrange the plurality of the detection lines 111.

In this regard, in case that there is one unit line 115, the detector 110 may be preferably disposed in such a manner that a plurality of the detection lines 111 included in the unit line 115 are extended in the same direction and spaced apart from each other in parallel. In this manner, a surface may be formed by the plurality of the detection lines 111, thereby facilitating a two-dimensional position tracking on the detection target 500. In order to facilitate such two-dimensional position tracking, it may be preferable that the detection lines 111 are spaced apart from each other by the same distance.

Meanwhile, here, the detection target 500 is the composite material made of a mixture of the base material and the reinforcing material. In detail, the detection target 500 may be configured in such a manner that in general, a number of reinforcing materials made of glass fibers or carbon fibers and the like are extended in a specific same direction and are arranged parallel to each other in the composite material. Here, even if the impact applied from the outside has the same size in every direction, the strain amount generated based on the extension direction of the reinforcement material may be different. That is, for example, it may be assumed that the reinforcement material extended in a horizontal direction applies impact to composite materials arranged to be parallel to each other in a longitudinal direction with a spherical impact ball. In this case, even though the applied impact is circular, the strain occurs less by a tensile force of the reinforcing material in the horizontal direction, and the strain occurs more because the bond between the reinforcing materials may be more easily broken in the longitudinal direction, and the generated strain amount may thus have an elliptical shape. Upon considering this point, when the extension direction of the detection line 111 and the extension direction of the reinforcement material forming the detection target 500 are different from each other, there is a risk in which the residual strain formed in the detection line 111 may be distorted compared to the impact actually applied to the detection target 500. Accordingly, in order for the detection line 111 to more accurately follow the type of impact actually applied to the detection target 500, it may be preferable that the extension direction of the detection line 111 is formed to be the same as the extension direction of the reinforcement material forming the detection target 500 to which the detection line 111 is attached.

FIG. 5 shows an example in which an extension direction of the detection line 111 in the upper unit line 115 and that of the detection line 111 in the lower unit line 115 are different from each other. This configuration may show that the extension direction of the detection line 111 is changed based on the extension direction of the reinforcement material in consideration of the properties of the composite material as described above. Meanwhile, FIGS. 6A to 6C show another embodiment in which the detector is disposed. FIGS. 1, 3A to 3C, 4A to 4C, etc., show that the detection target 500 has a flat plate shape, however, FIGS. 6A to 6C show that the detection target 500 has a cylindrical shape. In FIGS. 6A and 6B, the detection target 500 has the same external shape. However, the reinforcement materials in the composite material configuring each detection target 500 may have the extension directions different from each other. In FIG. 6A, when the reinforcement material in the composite material is extended in a direction to be wound around the cylinder, the detection lines 111 may also be extended in a circumferential direction of the cylindrical detection target 500 and spaced apart from each other in the longitudinal direction. In FIG. 6B, when the reinforcement material in the composite material is extended parallel to the extension direction of the cylinder, the detection lines 111s may also be extended in the longitudinal direction of the cylindrical detection target 500 and spaced apart from each other in the circumferential direction.

Meanwhile, in each example of FIGS. 6A and 6B, the one unit line 115 includes the plurality of detection lines 111 that are independent from each other, and thus the unit line 115 is formed by including the connection line 112. On the contrary, in the example of FIG. 6C, one single detection line 111 is included in the one unit line 115. As such, when there is one detection line 111 and the detection target 500 has a column shape similar to the cylindrical shape of FIGS. 6A and 6B, the detection line 111 may be disposed to be wound around the detection target 500 as shown in FIG. 6C to have some portions of the wound detection line 111 arranged to be spaced apart from each other in parallel.

As such, the detector 110 may be implemented by appropriately changing its installed position (surface/inside, etc.) or arrangement type (extension direction, separation distance, etc.) based on the shape of the detection target 500 (flat plate shape/cylindrical shape, etc.) or extension direction of the reinforcement material.

Results of Experiments Using Apparatus and Method of Present Invention for Detecting Composite Material Damage Due to Impact By describing the results of the experiments in which the apparatus and method as described above are actually manufactured, it may be shown that the apparatus and method of the present invention can effectively detect the position and level of the damage due to the impact on the composite material.

A. Experiment for Detecting Damage Due to Impact of Using Optical Fiber Attached onto Surface of Composite Cylinder

(1) Damage Detection Property for Each Optical Fiber Type

To confirm a level of a residual strain based on the property of an optical fiber, a comparative experiment is conducted using three types of optical fibers. A first type is an aluminum-coated optical fiber, a second type is a polyimide-coated optical fiber and a third type is a SMF (single-mode optical fiber). The aluminum-coated optical fiber has the same core, cladding structure and material as those of the SMF (single-mode optical fiber), but has an exterior of the cladding coated with aluminum at a thickness of about 20 um and an insertion loss of 0.6 dB/km. The polyimide-coated optical fiber also has the same core, cladding structure and material as those of the SMF (single-mode optical fiber), but has an exterior of the cladding coated with polyimide at a thickness of about 20 um and an insertion loss of 0.2 dB/km, and a cutoff wavelength of 1486 nm. The composite cylinder may be composed of a carbon fiber (T700 12K) and an epoxy resin (EPON826), and stacked in order of $[90°_2/+-20°_1/90°_3/+-20°_1/90°_3/+-20°_2/$Ethylene Propylene Terpolymers$]_\tau$ and produced by a filament winding process.

FIG. 7 shows optical fiber installed on a composite pressure vessel made of carbon fiber: FIG. 7A shows a condition in which the optical fiber is installed; and FIG. 7B shows a view in which the optical fiber is installed. That is, the experiment of FIG. 7 shows a case in which the apparatus 100 of the present invention for detecting the composite material damage due to the impact has the same shape as that of FIG. 6A. In this case, the detector 110 includes: a plurality of the detection lines 111 independent from each other, extended in the circumferential direction of the cylindrical detection target 500 and arranged to be spaced apart from each other by the same distance in the longitudinal direction; a pair of transmission lines 112 connected to the outermost ends of the detection lines 111, respectively; and a plurality of the connection lines 113 connecting the detection lines 111 to each other.

As shown in FIG. 7A, in the apparatus used in this experiment, the three optical fibers are fusion-bonded to each other in a length of about 3 m, and thus optical fiber having an entire length of 9 m is adhered to the surface of the composite cylinder. Both ends of the entire length of the optical fibers are connected to a phase modulation BOCDA (Brillouin Correlation Domain Analysis) sensor system for the optical fiber, respectively. The middle portions of the optical fiber have each length of 30 cm and are adhered onto the surface of the composite cylinder by an adhesive, and there are three adhesive spots for each type of optical fiber, and thus there are a total of nine adhesive spots. Each adhesive point is installed in a loop direction of the cylinder, and 20 cm is a distance between the adhesive points in an axial direction of the cylinder. 0.4 mm is a width of the adhesive surrounding the optical fiber, and an impact is applied to a position 1 cm laterally away from a position of the optical fiber. The impact is applied to each adhesive point of the optical fiber with impact energies of 40 J, 20 J and 10 J, and the impact energies and the impact points are shown in FIG. 3-97, respectively. The levels of the residual strain resulting from this impact are compared to each other. FIG. 7B is a view of the composite cylinder and the optical fiber adhered thereon, and the composite material is composed of multilayer carbon fibers and has a thickness of 6 mm.

As a result of the impact experiment based on the experimental conditions of FIG. 7, FIG. 8 shows the Brillouin frequency variation which is due to impacts respectively on each of an aluminum-coated optical fiber, a polyimide-coated optical fiber and a standard SMF (single-mode optical fiber) and measured using a phase-modulation BOCDA (Brillouin Correlation Domain Analysis) sensor system with a spatial resolution of about 2.5 cm. Here, the measurement is made on the position within about the 9 m, and the Brillouin frequency value measured at each position of the optical fiber is shown on a vertical axis of the graph. There are three sections showing the Brillouin frequency which is significantly different from that of the center. Each section corresponds to the aluminum-coated optical fiber, the polyimide-coated optical fiber or the standard SMF fiber. The reason why the Brillouin frequency shows such significant difference for each section is because a material composition of the core of each optical fiber is slightly different from each other. The aluminium-coated optical fiber has a Brillouin frequency at 10.815 GHz, the polyimide-coated optical fiber at 10.65 GHz and the standard SMF at 10.845 GHz. The both ends of these three sections are standard SMFs connected to the BOCDA system. There is a difference in the Brillouin frequency between the SMFs, which is common, and it is also common that the Brillouin frequency differs depending on the manufacturer and the model of the same manufacturer. This difference is clear in the given graph, and the position section is clearly classified based on the difference of optical fibers. When looking closely at each section of the optical fiber, there are three peaks in each section. The impact is applied to these positions, and all nine positions match the total number of impacts. If there is a difference, there is a difference in a shape of the peak based on the type of the optical fiber, the aluminium-coated optical fiber has the maximum Brillouin frequency variation produced by the impact, and the standard optical fiber has the smallest Brillouin frequency variation.

FIG. 9 is a view comparing a Brillouin frequency variation of a case in which three types of optical fibers receive impacts with different impact energies, respectively, and specifically shows the Brillouin frequency shifted when the three types of optical fibers, such as the aluminum-coated optical fiber, the polyimide-coated optical fiber and the standard SMF, receive the impacts with energies of 40 J, 20 J and 10 J, respectively. The horizontal axis of each graph shows a relative distance change based on the center position of the impact peak, and the vertical axis shows the relative change value after the impact based on the Brillouin frequency value before the impact. The aluminum-coated optical fiber receiving the impact energy of 40 J shows up to 700με strain change. However, the polyimide-coated optical fiber and the standard SMF have the maximum values of 300 ρε and 200με, respectively. When the impact energy is decreased, the maximum value is also decreased, however, the residual strain value of the aluminum-coated optical fiber is still the maximum, and the values of polyimide-coated optical fiber and standard SMF show features similar to each other. However, even at the impact of 10 J, the residual strain value is great enough to be measured. In particular, when the impact energy of 40 J is applied, the peak of the Brillouin frequency has a shape of a cracked peak rather than a single peak based on the property of the measured position.

(2) Damage Detection Property of Aluminum-Coated Optical Fiber

In order to confirm whether traces of the impact can be measured, the aluminum-coated optical fiber is adhered to the surface of the composite material cylinder as shown in FIG. 10. This optical fiber is used as a sensor to measure the residual strain occurring due to the impact in the BOCDA sensor system. The experiment of FIG. 10 also uses an apparatus 100 of the present invention for detecting composite material damage due to impact, which has the same shape as that of FIG. 6A.

This aluminum-coated optical fiber has the same core, cladding structure and material as those of the standard SMF, but only has an aluminum coating layer on the cladding and a total diameter of 170 μm. After applying impact to the cylinder, the BOCDA sensor system measures the residual strain of the aluminum-coated optical fiber adhered on the vessel. The composite cylinder is composed of the carbon fiber (T700 12K) and the epoxy resin (EPON) as the reinforcing fibers, and stacked in order of $[90°_1/OF/90°_1/+-20°_1/90°_3/+-20°_1/90°_3/+-20°_2/\text{Ethylene Propylene Terpolymers}]_r$. These materials are manufactured by a filament winding process, has the diameter of 26 cm and the thickness of 4.6 mm, which is seen in the view of FIG. 10B. The aluminum-coated optical fiber has six points clearly distinguished from each other to have clearly distinguished impact points in a length of a total of 7.3 m and middle portions having each length of 30 cm and adhered to the cylinder by a common adhesive (Devcon 2 Ton epoxy, ITW Inc.). A distance between the adhered optical fibers is about 1 m. The section of the adhered optical fiber is shown as vertical lines on the vessel in FIG. 10B and these vertical lines are all six spaced apart from each other by the same distance. This aluminum-coated optical fiber is fusion-bonded to the end of a tester optical fiber having a preceding length of 500 m. The impact is applied to a position of about 10 mm laterally away from the optical fiber from a midpoint of the optical fiber adhered onto the vessel. The position receiving the impact is indicated by an X in FIG. 10A. FIG. 11A shows that the impact is sequentially applied to the first three impact positions from the left with the impact energies of 10 J, 20 J and 40 J using a hemisphere impactor and the impact is sequentially applied to the rest three impact positions with the impact energies of 10 J, 20 J and 40 J using a wedge impactor.

FIG. 11 shows an impact load graph obtained from the sensor mounted on an impact application apparatus after applying the impact to the six points on the composite material cylinder. FIGS. 11A and 11B show the results of the impact using the wedge impactor and the hemisphere impactor, respectively. A double peak is seen in the case of the wedge impactor, and this phenomenon indicates that additional damage occurs at a boundary of the wedge impactor while the impact is being applied, and then the load is applied again. The hemisphere impactor does not show such a phenomenon. The position to which the impact is applied is marked on the surface of the composite cylinder with a white circle. The notation "w" indicates a wedge shape and "s" indicates a hemispherical shape.

FIG. 12 shows that a three-dimensional (3D) Brillouin gain graph of the optical fiber sensor mounted on the composite material cylinder could be obtained by using the phase modulation BOCDA sensor system. The horizontal axis indicates a distance on the aluminum-coated optical fiber, in which the position of 0 m coincides with the end position of the tester optical fiber of 500 m. The vertical axis indicates the frequency difference value between the frequency-sweeping CW (continuous-wave) probe light and the pumping pulse light. The peak value of this frequency difference value is the Brillouin frequency, and this value maintains the eigenvalue of 10.815 GHz constant in a measurement range, but changed at the six impact points. The distance between changes in the Brillouin frequency measured in the six positions exactly matches the actual impact position. The standard SMF and the polymer-coated optical fibers each show a region with a low Brillouin frequency at the both ends of the entire length of the optical fiber, in which their Brillouin frequency is 10.78 GHz. A graph of FIG. 12A is obtained by arranging only the peak frequency values from the gain graph of FIG. 12B, and FIG. 12A shows the change in the Brillouin frequency based on the position. FIG. 12A shows a comparison between the measured value before the impact and the change in the Brillouin frequency after the impact. The comparison clearly shows that the six peak points are created after the impact, which indicates that the residual strain values after the six sequential impacts are precisely measured. Unlike the six peak points, the peak values at the both ends of the aluminum-coated optical fiber are considered to be due to the strain occurring during the fusion-bonding process of the standard SMF and the aluminum-coated optical fiber to each other for the measurement.

FIG. 13 shows that the Brillouin frequency change at each impact point is more precisely measured by a measurement point condition corresponding to 1.25 mm intervals. In the graphs of FIGS. 13A, 13B and 13C, the distribution is given based on the position of the strain at each impact point. The graphs of FIGS. 13A, 13B and 13C show that the impact is applied with the impact energies of 40 J, 20 J and 10 J, respectively, using the wedge impactor; and the graphs of FIGS. 13D, 13E and 13F show that the impact is applied with the impact energies of 40 J, 20 J and 10 J, respectively, using the hemisphere impactor. In each graph, the vertical axis on the right indicates the change value of the Brillouin frequency, and the vertical axis on the left indicates the residual strain value corresponding to the frequency change value. When the impact energy is 10 J, the strain changes due to the wedge impactor and the hemisphere impactor show similar distribution properties of a single peak shape with a width of about 40 mm. The maximum variation value of the Brillouin frequency is about 300με. When the impact energy is 20 J, the maximum variation value of the Brillouin frequency is similar to that of 10 J, but the peak point is split into two portions, and this phenomenon occurs similarly in the both impactors. When the impact energy is 40 J, the cracking of the peak point becomes more severe, and the residual strain value due to the wedge impactor is changed more significantly than the residual strain value due to the hemisphere impactor. A high-speed imaging camera confirms the moment of the impact in which unrecoverable permanent damage occurs at the impact point of the composite cylinder due to the impact with the large impact energy of 40 J. This permanent damage is considered to be a cause of the great residual strain value.

To confirm a relationship between the distribution of the residual strain and the physical strain of the cylinder at the impact point, the high-speed camera captures a change on the surface of the vessel while the impact is applied to the composite cylinder. FIGS. 14A, 14B and 14C are shcematic diagrams under conditions of the impact energies of 10 J, 20 J and 40 J using the hemisphere impactor, respectively and obtained when the maximum strain occurs in each experimental condition. The impact is applied at a position 10 mm away from the optical fiber line. When comparing the strain on the vessel surface with the residual strain distribution in each impact experiment, a position having the maximum residual strain value at the condition of the impact energy of 10 J coincides well with the center point of the impact. However, as the impact energy is increased, a difference occurs between the position with the maximum residual strain value and the center point of the impact. It can be seen that a size of the surface strain is increased as the impact energy is increased, and at the condition of the impact energies of 20 J and 40 J, the position having the maximum residual strain value corresponds to an edge of the surface strain. It can be confirmed that the surface of the cylinder has the maximum curvature at the edge of this strain, which indicates that the great strain occurs. The measurement resulting from this cause is conducted to gain the maximum residual strain value at the same position. The impact occurs symmetrically at each impact point of the two edges, which explains why the measured residual strain peak is divided into two portions. In FIG. 14, the schematic diagrams are provided to describe the relationship between the physical strain shape on the surface of the cylinder and the position of the installed optical fiber.

TABLE 1

Burst pressure after impact experiment

| | Burst pressure (MPa) | | |
|---|---|---|---|
| Impactor | Energy: 10 J | Energy: 20 J | Energy: 40 J |
| Hemisphere | 41.3 | 41 | 31.7 |
| Wedge | 35.7 | 36.1 | 33.9 |

To investigate the influence of the impact on the composite material cylinder, after the impact experiment, the cylinder is cut into six loops including each impact point, and a convergence experiment is conducted on each loop. The result is given in Table 1 above. In case of the hemisphere impactor, the burst pressure is not reduced at the impact energies of 10 J and 20 J. However, when the impact energy is increased to 40 J, the burst pressure is significantly reduced. The wedge impactor shows the burst pressure decreased also at 10 and 20 J. The result of this hydraulic tester indicates that the phase modulation BOCDA sensor system using the aluminum-coated optical fiber is able to measure not only the residual strain due to large impact energy affecting the burst pressure but also the residual strain due to small impact energy that does not affect the burst pressure of the composite material.

B. Experiment for Detecting Damage Due to Impact by Detection Optical Fiber Buried in Composite Cylinder As shown in FIG. 15, it can be seen that there are many variations in frequency depending on the optical fiber length from the distribution of the Brillouin frequency (initial strain) measured by the BOCDA sensor after the composite combustion tube is manufactured and the tensile force of the SMF (single-mode optical fiber) is manually controlled during the manufacturing process. Therefore, this initial signal needs to be used as a reference signal to obtain information on the impact.

Accordingly, a new experimental condition is set as shown in FIG. 16. In detail, four impact application groups are established; an impact experiment is first performed at the energy levels of 10 J and 20 J, and its measurement is performed with the BOCDA sensor; then, an experiment is performed to apply an impact to the corresponding position of each impact application group at the energy level of 40 J again. The impact is applied about 10 or 15 cm away from the impact position. FIG. 16 shows this experimental condition. That is, in the experiment of FIG. 16, the apparatus 100 of the present invention for detecting the composite material damage due to the impact has the same shape as that of FIG. 6C. In this case, the detector 110 includes a single detection line 111 and a pair of transmission lines 112 connected to both ends of the detection lines 111, the detection line 111 is disposed to wound around the detection target 500, and the portions of the wound detection line 111 are disposed to be spaced apart from each other in parallel.

FIG. 17 shows an impact load curve on a SMF (single-mode fiber) on a composite combustion tube obtained by the experiment as described above. It can be seen that the magnitude of the load curve varies depending on the impact energy level from the impact load curve obtained during the impact experiment. The load curve to 100 msec is a signal by the impact. However, the other signal thereafter is a signal noise in the experiment.

The signals of respective impact application groups obtained from the BOCDA sensor after the impact experiment are summarized and shown in FIGS. 18 to 21.

Referring to FIG. 18, the position of impact application group 1 is shown around 306 to 337 m. Here, it can be seen that the impact trace is clearly shown on the impact position when measuring a signal generated due to the impact energy level of 10 J or 20 J by using the BOCDA sensor and then obtaining a difference between the signal and the reference signal. In addition, it can be seen that the impact trace is clearly shown on the corresponding position when applying the impact to the position with the impact energy of 40 J again, obtaining the signal measured by the BOCDA sensor, obtaining a difference between the signal and the reference signal, and then inspecting the signal.

Referring to FIG. 19, the position of impact application group 2 is shown around 336 to 360 m. Here, it is possible to obtain information on the impact when applying the impact to the position with the impact energy levels of 10 J and 20 J and then obtaining the difference between the signal, which is obtained using the BODA sensor and the reference signal. In addition, it is possible to extract a signal to distinguish the impact position and the impact energy level based on a difference between the signal obtained after applying the impact to the position with the impact energy level of 40 J and the reference signal.

Referring to FIG. 20, the position of impact application group 3 is shown around 360 to 383 m. Here, it is possible to obtain a signal to recognize the position of the impact and the impact energy level when applying the impact to the position with the impact energy levels of 10 J and 20 J, obtaining a signal by using the BODA sensor and then obtaining the difference between the signal and the reference signal. In addition, it is possible to obtain all information on the damage due to the impact applied with the energy levels of 10 J, 20 J and 40 J when applying additional impact to the position with the energy level of 40 J, obtaining a signal from the BOCDA sensor and the difference of the signal from the reference signal.

Referring to FIG. 21, impact application group 4 applies the impact to the position with the impact energy levels of 10 J, 20 J, 30 J and 40 J, in which the impact is applied to the position with the impact energy levels of 10 J and 20 J first in the vicinity of 383 to 410 m, and then additionally applied with the impact energy levels of 30 J and 40 J. Similar to the results of the other impact application groups, it is possible to clearly distinguish the differences in the impact energy levels of 10 J, 20 J, 30 J and 40 J. In addition, it is possible to distinguish the position where the impact occurs by an error of 10 cm or less.

FIG. 22 shows a conceptual diagram of the principle of outputting the position and level of an impact obtained as described above. The principle may be described as follows by using the same drawing as in FIG. 6C which shows a similar experimental condition to that of FIG. 16.

In FIG. 22A, the detection line 111 may be disposed to wound around the detection target 500 in a cylindrical shape, and the portions of the detected detection line 111 may be spaced apart from each other in parallel. In FIG. 22A, the detection line 111 may be wound 16 times, and indexes of 1, 2, . . . 16 for its respective wheels may be attached and angled from 0 to 360 degrees along a direction in which the detection line 111 is wound. In FIG. 22A, the impact applied to a 270-degree position of the twelfth wheel may be shadowed. The position (of 12th, 270 degrees) is a center of the impact position, and here, the impact level may be the strongest, and the farther from this position, the weaker the impact level and the impact level may be weak on the 11th and 13th wheels.

FIG. 22B shows each wheel of the detection line 111 for each index and is disposed on a two-dimensional plane. In FIG. 22B, an X-axis indicates an angle, an Y-axis indicates an index, and a Z-axis indicates an impact level. The residual strain of the detection line 111 may be proportional to the level of the impact. Therefore, when the residual strain value measured at each index-th wheel of the detection line 111 is displayed on the Z-axis, the maximum peak may appear (at 12th, 270 degrees) as shown in FIG. 22B, and symmetrically the small peaks may appear (at 11th, 270 degrees and 13th, 270 degrees).

FIG. 22B is a three-dimensional view to describe the principle of mapping the position and level of the impact on a two-dimensional plane. Here, if the level of impact may be displayed as a color change instead of the Z-axis height, the two-dimensional plane itself is enough to display the principle. FIG. 22C is a view showing the level of the impact as a shading on the two-dimensional plane including the angle in the X-axis and the index in the Y-axis. In FIG. 22B, when the Z-axis height is higher, the shadow appears darker. Therefore, even from FIG. 22C, it may be easy to see that the darkest shadow (12th, 270 degrees) indicates the impact position, and the level of the impact may also be easily seen from the level of the shading.

As such, the position and level of the impact may be easily identified from an output result shown in a 3D graph as shown in FIG. 22B or a shadow on the 2D plane as shown in FIG. 22C. That is, if the coordinate values of the detection optical fibers are pre-specified and displayed on a mapped two-dimensional plane, and the measured residual strain value (as shown in the principle of FIG. 22) is displayed in three-dimensional height or shadow, it is possible to easily calculate the position and level of the impact by comparing the values with those in a general residual strain pattern of the damage due to the impact. The general residual strain pattern of the damage due to the impact may be symmetrically distributed based on the center of the impact, and a region of the damage due to the impact may thus be determined by a size of the region in which the residual strain is symmetrically shown.

FIGS. 23 and 24 show the experimental results of FIG. 16 on a two-dimensional plane through the process as described above. FIG. 23 shows the position and level of an impact applied to a SMF (single-mode fiber) on a composite combustion tube (with loads of 10 J and 20 J), and FIG. 24 shows the position and level of an impact applied to a SMF (single-mode fiber) on a composite combustion tube (with loads of 10 J, 20 J, 30 J or 40 J), respectively. First, the difference may be found between the BOCDA sensor signal obtained from the composite combustion tube with the SMF (single-mode optical fiber) thereon after the impact and the reference signal. Here, the signal information on a length direction of the optical fiber may be displayed by allowing the X-axis to indicate a length of the composite combustion tube and allowing the Y-axis to indicate a circumference of the composite combustion tube. Then, the impact position and impact energy level may be visually confirmed by applying the impact to the impact position only with the impact energy levels of 10 J and 20 J, measuring the signal, and detecting the signal at the corresponding position as shown in FIG. 23. In addition, it can be seen that the information on the impact after applying the impact to the position with the impact energy levels of 10 J, 20 J, 30 J and 40 J is smoothly displayed in the corresponding position as shown in FIG. 24.

The present invention is not limited to the above-mentioned embodiments, but may be variously applied. In addition, the present invention may be variously modified by those skilled in the art to which the present invention pertains without departing from the gist of the present invention claimed in the claims.

INVENTION TITLE INDUSTRIAL APPLICABILITY

According to the present invention, it is possible to effectively detect such damage due to the low-velocity impact and use the detection result as the determination criteria on whether the composite material structure needs reinforcement, replacement or the like, thereby greatly improving the safety and reliability of the composite material structure in the long term ultimately. In addition, according to the present invention, even if the composite material itself is restored to its original shape after the impact, it is possible to easily detect the occurrence and level of the damage due to the impact in the composite material by measuring the residual strain of the optical fiber distributed on the surface of the composite material or in the composite material, thereby fundamentally solving the problem of the real-time detection technology as described above.

The invention claimed is:
1. An apparatus for detecting damage due to impact on a detection target made of a composite material in which a base material and a reinforcement material are mixed with each other, the apparatus comprising:
   a detector comprising a detector line that comprises detection lines respectively made of an optical fiber and being in contact with a surface of the detection target, a transmission line made of an optical fiber and connected to an outermost one of the detection lines to transmit signals between the detection lines and outside of the detection target, and at least one connection line made of an optical fiber and connecting two of the detection lines; and
   an analyzer connected to the detector via the transmission line and configured to calculate a position and level of the damage due to the impact on the detection target based on a residual strain of the optical fiber, wherein a coating layer made of a metal material or a resin material is formed on the surface of the optical fiber, and wherein in order to calculate the position and level of the damage due to the impact on the detection target by using a relationship between a Brillouin frequency shift value and strain of the optical fiber, the analyzer is configured to:
  determine the Brillouin frequency shift value of the optical fiber measured before occurrence of the damage due to the impact as a reference value,
  compare the reference value with a changed Brillouin frequency shift value of the detection lines measured after the occurrence of the damage due to the impact and restoration to an original shape of the detection target, and
  calculate the residual strain of the detection lines after the occurrence of the damage due to the impact and the restoration to the original shape of the detection target based on comparing the reference value with the changed Brillouin frequency shift value,
wherein the detection lines of the detector line extend to be parallel to each other,
wherein the detector comprises an additional detector line comprising additional detection lines respectively made of an optical fiber and extending to be parallel to each other, an additional transmission line made of an optical fiber and connected to an outermost one of the additional detection lines to transmit signals between the additional detection lines and outside of the detection target, and at least one additional connection line made of an optical fiber and connecting two of the additional detection lines,
wherein the detection lines of the detector line extend in a first direction and the additional detection lines of the additional detector line extend in a second direction different from the first direction, and
wherein the additional detection lines of the additional detector line are buried in the detection target while the detection lines of the detector line are attached to the surface of the detection target.

2. The apparatus of claim 1, wherein the optical fiber is attached to the surface of the detection target by an adhesive.

3. The apparatus of claim 1, wherein the detection target comprises a first layer and a second layer, wherein the additional detection lines of the additional detector line is interposed between the first layer and the second layer while the detection lines of the detector line is attached to a surface of the first layer facing away from the second layer.

4. The apparatus of claim 1, wherein the detection target comprises reinforcing fibers having an extension direction, and wherein the detection lines extend along the extension direction.

* * * * *